US012437460B2

(12) United States Patent
Sakaki

(10) Patent No.: US 12,437,460 B2
(45) Date of Patent: Oct. 7, 2025

(54) INFORMATION PROCESSING SYSTEM, INFORMATION PROCESSING METHOD, AND PROGRAM

(71) Applicant: GREE, Inc., Tokyo (JP)

(72) Inventor: Takuma Sakaki, Kanagawa (JP)

(73) Assignee: GREE HOLDINGS, INC., Tokyo (JP)

( * ) Notice: Subject to any disclaimer, the term of this patent is extended or adjusted under 35 U.S.C. 154(b) by 266 days.

(21) Appl. No.: 18/342,976

(22) Filed: Jun. 28, 2023

(65) Prior Publication Data

US 2024/0020906 A1 Jan. 18, 2024

(30) Foreign Application Priority Data

Jul. 15, 2022 (JP) ................. 2022-114294

(51) Int. Cl.
*G06T 15/00* (2011.01)
*G06F 3/04815* (2022.01)

(52) U.S. Cl.
CPC .......... *G06T 15/00* (2013.01); *G06F 3/04815* (2013.01)

(58) Field of Classification Search
None
See application file for complete search history.

(56) References Cited

U.S. PATENT DOCUMENTS

2016/0361649 A1 12/2016 Hayashi
2020/0023276 A1* 1/2020 Chen .................. A63F 13/5258
2020/0082632 A1* 3/2020 Burns ................. G02B 27/0172
2020/0108308 A1* 4/2020 Shinoda .................. A63F 13/26
2020/0368625 A1* 11/2020 Iwata .................... A63F 13/216
2024/0082713 A1* 3/2024 Sawaki ................. G06T 19/003

FOREIGN PATENT DOCUMENTS

| JP | 2000039949 A | 2/2000 |
| JP | 2017545 A | 1/2017 |
| JP | 2019192026 A | 10/2019 |

OTHER PUBLICATIONS

Office Action issued on Jul. 4, 2023, in corresponding Japanese Application No. 2022-114294; 4 pages.
Office Action issued on Oct. 3, 2023, in corresponding Japanese Application No. 2022-114294; 5 pages.
Office Action issued on Dec. 5, 2023, in corresponding Japanese Application No. 2022-114294; 2 pages.

* cited by examiner

*Primary Examiner* — Nurun Flora
(74) *Attorney, Agent, or Firm* — Maier & Maier, PLLC

(57) ABSTRACT

An information processing system, including: an input acquisition unit acquiring user input from a user associated with a predetermined display medium movable in a virtual space; a position control unit controlling a position of the predetermined display medium in the virtual space, on the basis of the user input; and an output processing unit outputting a user interface capable of generating the user input, the output processing unit switching the user interface from a first user interface to a second user interface when the predetermined display medium is moved from a first position to a second position in the virtual space, in which the output processing unit changes a switching mode from a first user interface to a second user interface, on the basis of a positional relationship between the first position and the second position in the virtual space.

19 Claims, 23 Drawing Sheets

FIG. 17

| USER ID | USER NAME | USER AVATAR ID | POSITION/DIRECTION INFORMATION | RANK | INFORMATION RELEVANT TO OWNED GAME MEDIUM | INFORMATION RELEVANT TO USED GAME MEDIUM | FRIEND INFORMATION |
|---|---|---|---|---|---|---|---|
| U01 | USER A | *** | **** | *** | *** | *** | *** |
| U01 | USER B | *** | **** | *** | *** | *** | *** |
| ... | ... | ... | ... | ... | ... | ... | ... |

600

INFORMATION PROCESSING SYSTEM, INFORMATION PROCESSING METHOD, AND PROGRAM

FIELD

The present disclosure relates to an information processing system, an information processing method, and a program.

BACKGROUND

A technology is known in which in order to capture an avatar (a predetermined display medium) that moves within a virtual space within a virtual space image, virtual camera coordinates at which an avatar desired to be captured in a capturing range is included in the capturing range are calculated from a positional relationship of the avatar, and a virtual camera is moved to the calculated virtual camera coordinates.

SUMMARY

However, in the related art as described above, it is difficult to attain the transition of a user interface associated with the movement of the avatar in the virtual space, or the like with a reduced sense of discomfort or without a sense of discomfort.

Therefore, in one aspect, an object of the disclosure is to suitably attain the transition of a user interface associated with the movement of a predetermined display medium in a virtual space.

Solution to Problem

In one aspect, an information processing system, including: an input acquisition unit acquiring user input from a user associated with a predetermined display medium movable in a virtual space; a position control unit controlling a position of the predetermined display medium in the virtual space, on the basis of the user input; and an output processing unit outputting a user interface capable of generating the user input, the output processing unit switching the user interface from a first user interface to a second user interface when the predetermined display medium is moved from a first position to a second position in the virtual space, in which the output processing unit changes a switching mode from the first user interface to the second user interface, on the basis of a positional relationship between the first position and the second position in the virtual space, is provided.

In one aspect, according to the disclosure, it is possible to suitably attain the transition of the user interface associated with the movement of the predetermined display medium in the virtual space.

BRIEF DESCRIPTION OF THE FIGURES

FIG. 17 is an explanatory diagram of data in a user database;

DETAILED DESCRIPTION

Figure 1:
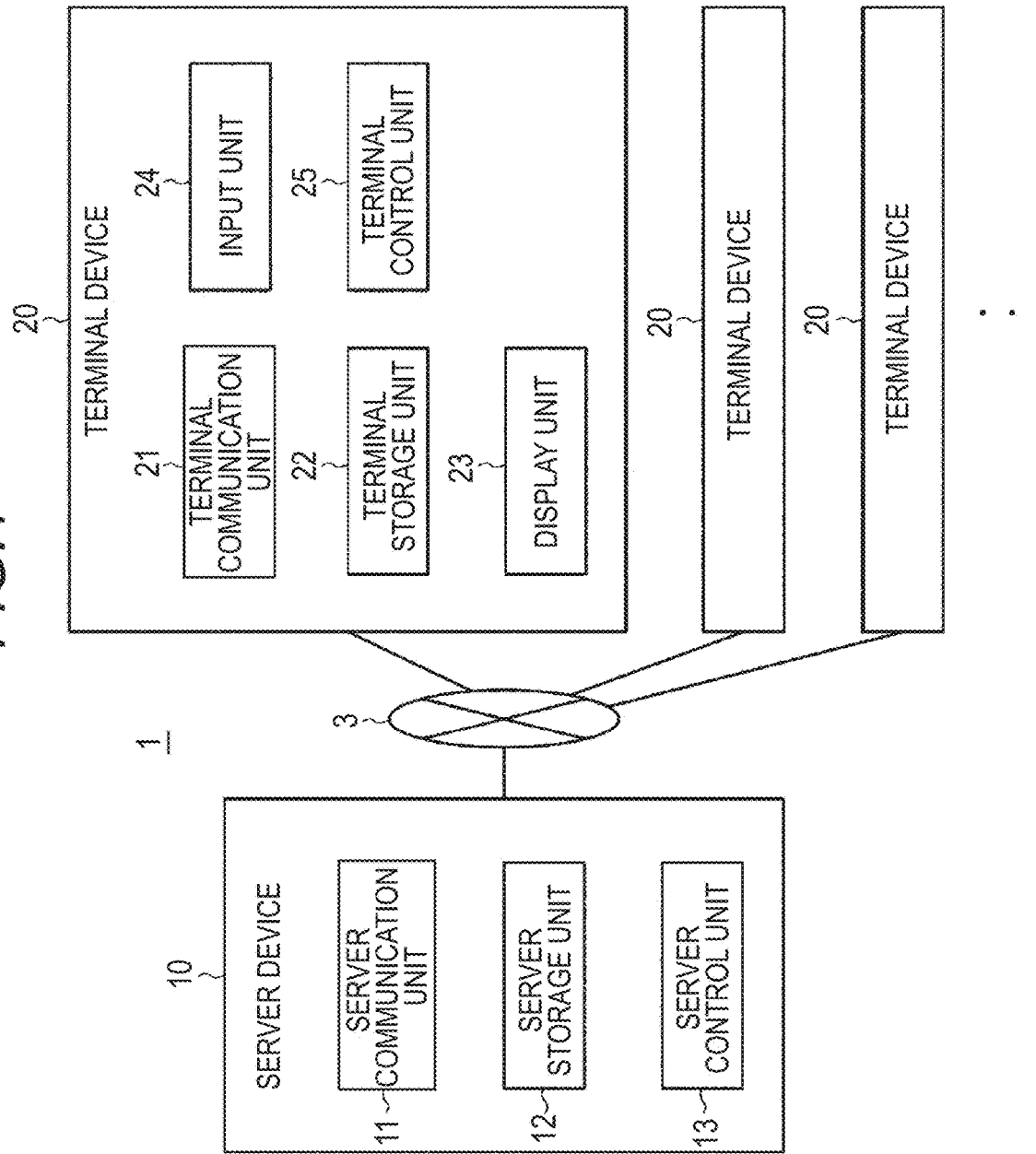
FIG. 1 is a block diagram of a virtual reality generation system according to this embodiment.
Figure 2:
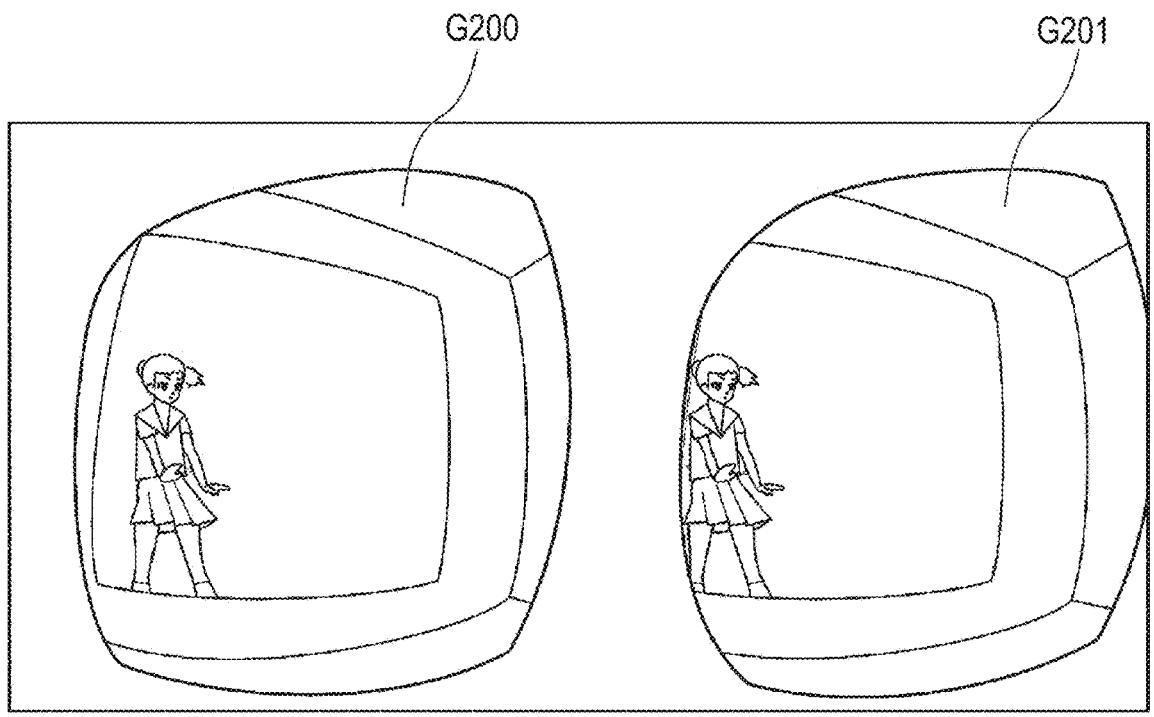
FIG. 2 is an explanatory diagram of a terminal image that is visible through a head mounted display.

With reference to FIG. 1, the outline of a virtual reality generation system 1 according to one embodiment of the present disclosure will be described. FIG. 1 is a block diagram of the virtual reality generation system 1 according to this embodiment. FIG. 2 is an explanatory diagram of a terminal image that is visible through a head mounted display.

The virtual reality generation system 1 includes a server device 10, and one or more terminal devices 20. In FIG. 1, for simplicity, three terminal devices 20 are illustrated, but the number of terminal devices 20 may be 2 or more.

The server device 10, for example, is an information processing system such as a server managed by an administrator providing one or more virtual realities. The terminal device 20, for example, is a device used by a user, such as a mobile phone, a smart phone, a tablet terminal, a personal computer (PC), a head mounted display, or a game device. A plurality of terminal devices 20 can be connected to the server device 10 through a network 3, typically in a manner different for each user.

The terminal device 20 is capable of executing a virtual reality application according to this embodiment. The virtual reality application may be received in the terminal device 20 from the server device 10 or a predetermined application distribution server through the network 3, or may be stored in advance in a storage device provided in the terminal device 20 or in a storage medium readable by the terminal device 20, such as a memory card. The server device 10 and the terminal device 20 are connected through the network 3 such that communication is available. For example, the server device 10 and the terminal device 20 execute various processing pieces relevant to a virtual reality, in cooperation.

The terminal devices 20 are connected to each other through the server device 10 such that communication is available. Note that, hereinafter, "one terminal device 20 transmits information to another terminal device 20" indicates that "one terminal device 20 transmits information to another terminal device 20 through the server device 10". Similarly, "one terminal device 20 receives information from another terminal device 20" indicates that "one terminal device 20 receives information from another terminal device 20 through the server device 10". Here, in a modification example, the terminal devices 20 may be connected to each other such that communication is available without using the server device 10.

Note that, the network 3 may include a wireless communication network, the internet, a virtual private network (VPN), a wide area network (WAN), a wired network, any combination thereof, or the like.

Hereinafter, the virtual reality generation system 1 attains an example of the information processing system, but each element (refer to a terminal communication unit 21 to a terminal control unit 25 in FIG. 1) of one specific terminal device 20 may attain an example of the information processing system, or the plurality of terminal devices 20 may attain an example of the information processing system in cooperation. In addition, the server device 10 may independently attain an example of the information processing system, or the server device 10 and one or more terminal devices 20 may attain an example of the information processing system in cooperation.

Here, the outline of a virtual reality according to this embodiment will be described. The virtual reality according to this embodiment, for example, is a virtual reality for any reality such as education, travel, role playing, simulation, and entertainment such as a game or a concert, in which a virtual reality medium such as an avatar is used in association with the execution of the virtual reality. For example, the virtual reality according to this embodiment may be attained by a three-dimensional virtual space, various virtual reality media appearing in the virtual space, and various contents provided in the virtual space.

The virtual reality medium is electronic data used in the virtual reality, and for example, includes any medium such as a card, an item, a point, a currency in a service (or a currency in a virtual reality), a token (for example, a non-fungible token (NFT)), a ticket, a character, an avatar, and a parameter. In addition, the virtual reality medium may be information associated with the virtual reality, such as level information, status information, parameter information (a HP value, offense power, and the like), or capability information (a skill, ability, a spell, a job, and the like). In addition, the virtual reality medium is electronic data that can be acquired, owned, used, managed, exchanged, composed, enhanced, sold, discarded, or given by the user in the virtual reality, but a usage mode of the virtual reality medium is not limited to those specified in this specification.

Note that, typically, the avatar is in the form of a character with a front direction, and may have the form of a person, an animal, or the like. The avatar is associated with various avatar items, and thus, may have various appearances (appearances when drawn). In addition, hereinafter, for the properties of the avatar, the user and the avatar may be described in the same light. Accordingly, for example, "one avatar is ∘∘" may be synonymous with "one user is ∘∘". Note that, in this specification, "A is associated with B" is a concept including not only a state where A is directly associated with B, but also a state in which A is indirectly associated with B (for example, a state where A is directly associated with C, and C is directly associated with B).

The user may wear a wearable device on a part of the head or the face, and may visually recognize the virtual space through the wearable device. Note that, the wearable device may be a head mounted display or a spectacle-type device. The spectacle-type device may be so-called augmented reality (AR) glass or mixed reality (MR) glass. In any case, the wearable device may be separated from the terminal device 20, and may attain a part or all of the functions of the terminal device 20. The terminal device 20 may be attained by the head mounted display.

(Configuration of Server Device)

The configuration of the server device 10 will be described in detail. The server device 10 includes a server computer. The server device 10 may be attained by a plurality of server computers, in cooperation. For example, the server device 10 may be attained by a server computer providing various contents, a server computer attaining various authentication servers, and the like, in cooperation. In addition, the server device 10 may include a Web server. In this case, a part of the functions of the terminal device 20 described below may be attained by a browser processing an HTML document received from the Web server, or various attendant programs (Javascript) thereof.

As illustrated in FIG. 1, the server device 10 includes a server communication unit 11, a server storage unit 12, and a server control unit 13.

The server communication unit 11 includes an interface that communicates with an external device in a wireless or wired manner, and transmits and receives information. The server communication unit 11, for example, may include a wireless local area network (LAN) communication module, a wired LAN communication module, or the like. The server communication unit 11 is capable of transmitting and receiving information with respect to the terminal device 20 through the network 3.

The server storage unit 12, for example, is a storage device, and stores various information pieces and programs required for various processing pieces relevant to a virtual reality.

The server control unit 13 may include a dedicated microprocessor, a central processing unit (CPU) attaining a specific function by reading in a specific program, a graphics processing unit (GPU), and the like. For example, the server control unit 13 executes the virtual reality application in accordance with user input, in cooperation with the terminal device 20.

The server control unit 13 (the same applies to the terminal control unit 25 described below) can be configured as a circuit (circuitry) including one or a plurality of processors operated in accordance with a computer program (software), one or a plurality of dedicated hardware circuits executing at least a part of various processing pieces, or a combination thereof.

(Configuration of Terminal Device)

The configuration of the terminal device 20 will be described. As illustrated in FIG. 1, the terminal device 20 includes a terminal communication unit 21, a terminal storage unit 22, a display unit 23, an input unit 24, and a terminal control unit 25.

The terminal communication unit 21 includes an interface that communicates with an external device in a wireless or wired manner, and transmits and receives information. The terminal communication unit 21, for example, may include a wireless communication module, a wireless LAN communication module, a wired LAN communication module, or the like corresponding to mobile communication standard such as long term evolution (LTE) (Registered Trademark), LTE-advanced (LTE-A), the fifth-generation mobile communication system, and ultra mobile broadband (UMB). The terminal communication unit 21 is capable of transmitting and receiving information with respect to the server device through the network 3.

The terminal storage unit 22, for example, includes a primary storage device and a secondary storage device. For example, the terminal storage unit 22 may include a semiconductor memory, a magnetic memory, an optical memory, or the like. The terminal storage unit 22 stores various information pieces and programs that are received from the server device 10 and used in the processing of the virtual reality. The information and the program used in the processing of the virtual reality may be acquired from an external device through the terminal communication unit 21. For example, a virtual reality application program may be acquired from a predetermined application distribution server. Hereinafter, the application program may be simply referred to as an application.

In addition, the terminal storage unit 22 may store data for drawing a virtual space, for example, an image of an indoor space such as a building or an outdoor space. Note that, a plurality of types of data pieces for drawing a virtual space may be prepared for each virtual space, and may be suitably used.

In addition, the terminal storage unit 22 may store various images (texture images) for projection (texture-mapping) onto various objects disposed in the three-dimensional virtual space.

For example, the terminal storage unit 22 stores avatar drawing information according to an avatar as the virtual reality medium associated with each user. The avatar in the virtual space is drawn on the basis of the avatar drawing information according to the avatar.

In addition, the terminal storage unit 22, for example, stores drawing information according to various objects (virtual reality media) different from the avatar, such as various gift objects, buildings, walls, or non player characters (NPC). The various objects in the virtual space are drawn on the basis of such drawing information. Note that, the gift object is an object corresponding to a gift (a present) from one user to another user, and is a part of the items. The gift object may be an object (clothes and accessories) worn by the avatar or an object (fireworks, flowers, and the like) decorated on the avatar, the background (wallpaper) and the like, a ticket or the like that can be drawn in Gacha (a lottery). Note that, the term of "gift" used in this application indicates the same concept as that of the term of "token". Therefore, it is also possible to understand the technology described in this application by replacing the term of "gift" with the term of "token".

The display unit 23, for example, includes a display device such as a liquid crystal display or an organic electroluminescence (EL) display. The display unit 23 is capable of displaying various images. The display unit 23, for example, includes a touch panel, and functions as an interface detecting various user manipulations. Note that, the display unit 23 may be embedded in the head mounted display as described above.

The input unit 24 may include a physical key, and may further include any input interface including a pointing device such as a mouse. In addition, the input unit 24 may be capable of receiving non-contact type user input such as voice input, gesture input, or visual line input. Note that, in the gesture input, a sensor for detecting various states of the user (an image sensor, an acceleration sensor, a distance sensor, and the like), dedicated motion capture in which a sensor technology and a camera are combined, a controller such as a joypad, and the like may be used. In addition, a camera for detecting a visual line may be disposed in the head mounted display. Note that, as described above, various states of the user, for example, are the direction, the position, the movement, or the like of the user, and in this case, the direction, the position, or the movement of the user is a concept including not only the direction, the position, or the movement of a part or all of the body of the user, such as the face or the hand, but also the direction, the position, the movement, or the like of the visual line of the user.

Figure 3:
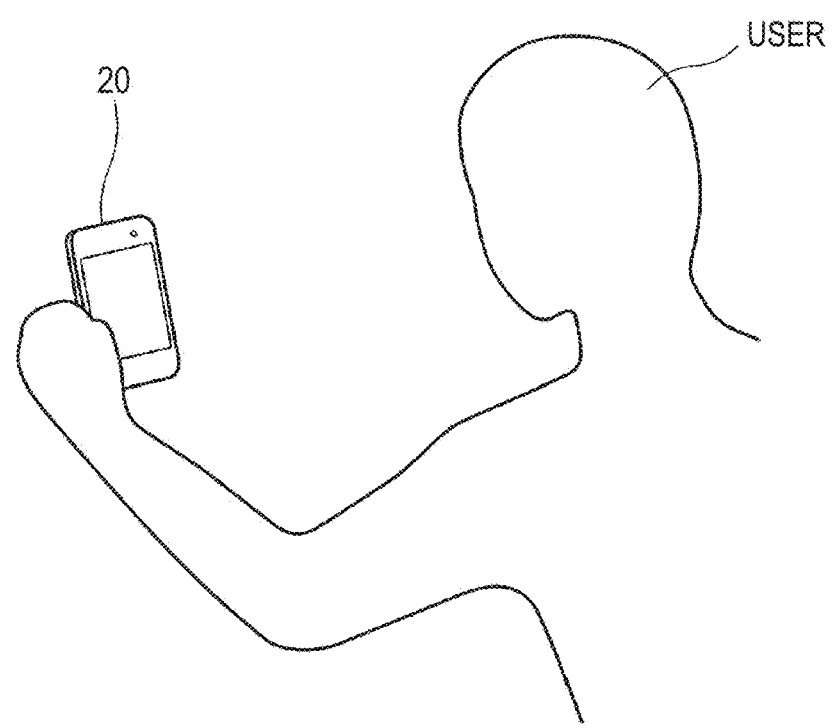
FIG. 3 is an explanatory diagram of manipulation input by a gesture.

Note that, manipulation input by a gesture may be used to change the viewpoint of a virtual camera. For example, as schematically illustrated in FIG. 3, in a case where the own user changes the direction of the terminal device 20 while holding the terminal device with the hand, the viewpoint of the virtual camera may be changed in accordance with the direction. In this case, even when using the terminal device 20 with a comparatively small screen, such as a smart phone, the width of a visually recognizable range can be ensured in the same manner as taking a look around through the head mounted display.

The terminal control unit 25 includes one or more processors. The terminal control unit 25 controls the operation of the entire terminal device 20.

The terminal control unit 25 transmits and receives information through the terminal communication unit 21. For example, the terminal control unit 25 receives various information pieces and programs used in various processing pieces according to a virtual reality from at least one of the server device 10 and another external server. The terminal control unit 25 stores the received information and program in the terminal storage unit 22. For example, the terminal storage unit 22 may store a browser (an internet browser) for connection to the Web server.

The terminal control unit 25 activates the virtual reality application in accordance with the manipulation of the user. The terminal control unit 25 executes various processing pieces according to a virtual reality, in cooperation with the server device 10. For example, the terminal control unit 25 displays the image of the virtual space on the display unit 23. On a screen, for example, a graphical user interface (GUI) detecting the user manipulation may be displayed. The terminal control unit 25 is capable of detecting the user manipulation through the input unit 24. For example, the terminal control unit 25 is capable of detecting various manipulations by the gesture of the user (manipulations corresponding to a tap manipulation, a long tap manipulation, a flick manipulation, a swipe manipulation, and the like). The terminal control unit 25 transmits manipulation information to the server device 10.

The terminal control unit 25 draws the avatar or the like together with the virtual space (the image), and displays the terminal image on the display unit 23. In this case, for example, as illustrated in FIG. 2, by generating images G200 and G201 that are visually recognized with the right and left eyes, respectively, a stereoscopic image for a head mounted display may be generated. In FIG. 2, the images G200 and G201 that are visually recognized with the right and left eyes, respectively, are schematically illustrated. Note that, hereinafter, unless specifically mentioned, the image of the virtual space indicates the entire image expressed by the images G200 and G201. In addition, the terminal control unit 25, for example, attains various movements or the like of the avatar in the virtual space, in accordance with various manipulations of the user.

Note that, the virtual space described below is a concept including not only an immersive space visible by using a head mounted display or the like, which is a continuous three-dimensional space in which the user can freely move around through the avatar (same as the reality), but also a non-immersive space visible by using a smart phone or the like as described above with reference to FIG. 3. Note that, the non-immersive space visible by using the smart phone or the like may be the continuous three-dimensional space in which the user can freely move around through the avatar, or may be a discontinuous two-dimensional space. Hereinafter, for discrimination, the continuous three-dimensional space in which the user can freely move around through the avatar will also be referred to as a "metaverse space".

In addition, various objects or facilities (for example, a movie theater and the like) that appear in the following description are objects in the virtual space, and are different from real objects, unless specifically mentioned. In addition, various events in the following description are various events (for example, movie screening and the like) in the virtual space, and are different from events in the reality.

In addition, hereinafter, an object that corresponds to any virtual reality medium (for example, buildings, walls, trees, NPCs, or the like) different from the avatar, and is drawn in the virtual space will also be referred to as a second object M3. Note that, in this embodiment, the second object M3 may include an object fixed in the virtual space, a movable object in the virtual space, and the like. In addition, the second object M3 may include an object constantly disposed in the virtual space, an object disposed only in a case where a predetermined disposition condition is satisfied, and the like.

In addition, in the following description, the avatar will be mainly described, but in a case where the virtual space is a game space, the avatar can be replaced with a game medium (for example, a game character) manipulated by the user.

Figure 4:
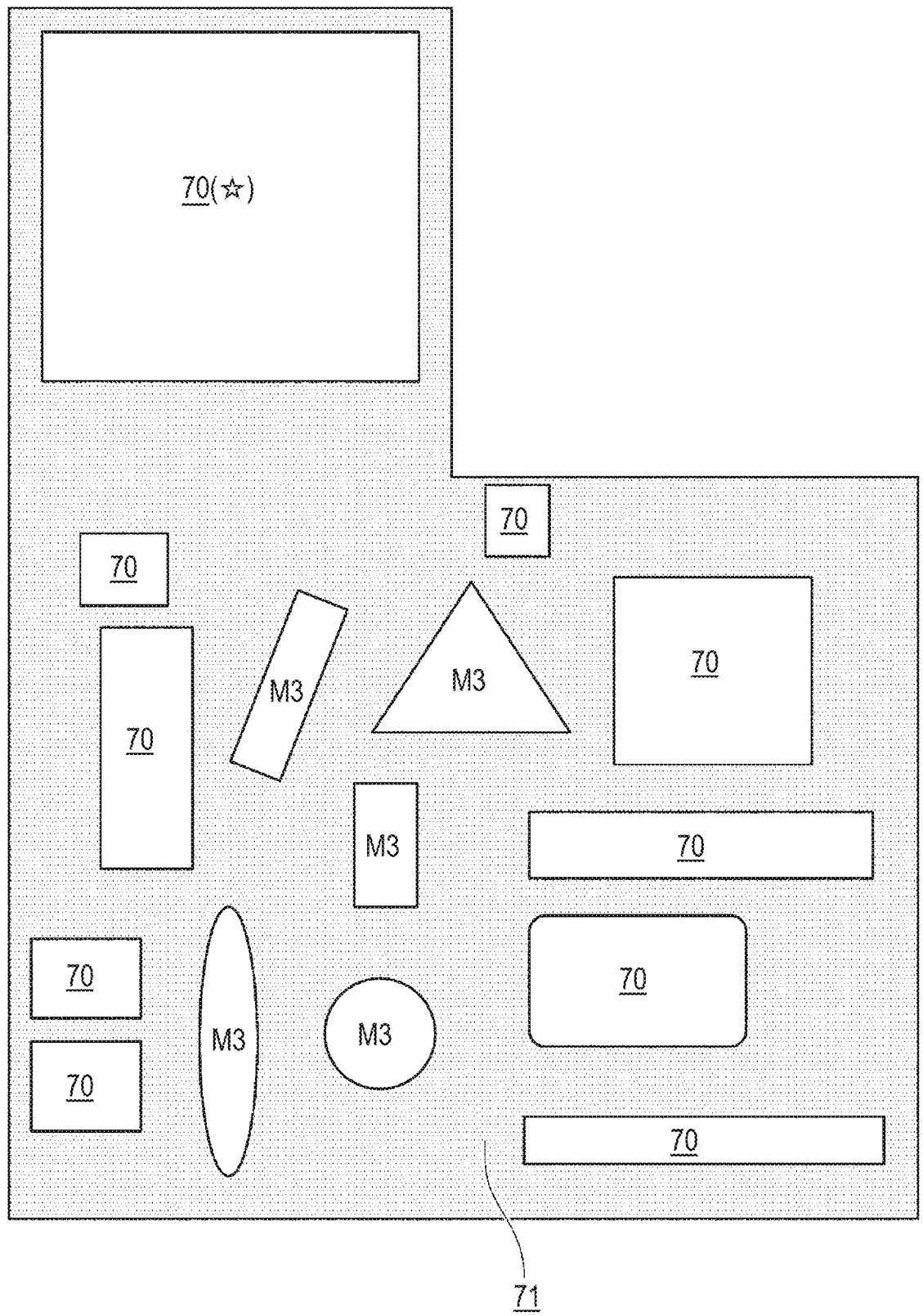
FIG. 4 is an explanatory diagram of an example of a virtual space that can be generated by the virtual reality generation system.

FIG. 4 is an explanatory diagram of an example of the virtual space that can be generated by the virtual reality generation system.

In the example illustrated in FIG. 4, the virtual space includes a plurality of space portions 70 and a free space portion 71. In the free space portion 71, basically, the avatar is capable of freely moving. In this case, each of the space portions 70 may be local division referred to as world, or the entire virtual space may be a global space. A part or all of the plurality of space portions 70 may be a part of a virtual space constructed by one platformer, or may be a virtual space itself constructed by a plurality of different platformers.

Each of the space portions 70 may be a space portion in which at least a part of the free space portion 71 is partitioned by a wall structure (an example of the second object M3) or a movement prohibition portion (an example of the second object M3). For example, the space portion 70 may include an entrance (for example, the second object M3 such as a hole or a door) through which the avatar is capable of going into and out from the free space portion 71. In the space portion 70, contents may be provided to the avatar positioned in the space portion 70.

The space portion 70 may be a space portion in which at least a part of the free space portion 71 is partitioned by the wall structure or the movement prohibition portion. For example, the space portion 70, may include an entrance (for example, a second object M3 such as a hole or a door) through which the avatar is capable of going into and out from the free space portion 71. Note that, in FIG. 4, the space portion 70 and the free space portion 71 are drawn as a two-dimensional plane, but the space portion 70 and the free space portion 71 may be set as a three-dimensional space. For example, the space portion 70 and the free space portion 71 may be a space including the walls and the ceiling in the corresponding range with the plane shape illustrated in FIG. 4 as the floor. In addition, unlike the example illustrated in FIG. 4, the space portion and the free space portion may be a world imitating the astrospace in which the avatar flies, in addition to a space with a height, such as dome-shaped space or a spherical space, a building structure such as a building, and a specific place on earth.

The plurality of space portions 70 may include a space portion for providing contents. Note that, in the free space portion 71, contents (for example, various contents described below that are provided in the space portion 70) may be suitably provided.

Any type or the number of contents is to be provided in the space portion 70 (contents provided in the virtual reality). In this embodiment, as an example, the contents provided in the space portion 70 include digital contents such as various videos. The video may be a real-time video, or may be a non-real-time video. In addition, the video may be a video based on a real image, or may be a video based on computer graphics (CG). The video may be a video for providing information. In this case, the video may be relevant to a specific genre of information provision service (an information provision service relevant to the journey, living, food, fashion, health, beauty, and the like), a broadcasting service of a specific user (for example, Youtube (Registered Trademark)), and the like.

Note that, the contents provided in the space portion 70 may be various items (an example of the second object) that can be used in the virtual space. In this case, the space portion 70 that provides various items may be in the form of a store. Alternatively, the contents provided in the space portion 70 may be various games, acquisition authority for goods available in the reality, a token, or the like. Note that, a part of the plurality of space portions 70 may be a space portion that does not provide contents.

Each of the space portions 70 may be operated by the same subject as that of a real store in the reality, or a different subject. In this case, an administrator according to each of the space portions 70 may use the corresponding space portion 70 by paying an exhibition cost or the like to the administrator of this virtual reality generation system 1.

Note that, the virtual space may be expandable in accordance with an increase in the space portion 70. Alternatively, a plurality of virtual spaces may be set for each attribute of the contents provided in the space portion 70. In this case, the virtual spaces may be discontinuous from each other as the "space portion", or may be continuous to each other.

Figure 5:
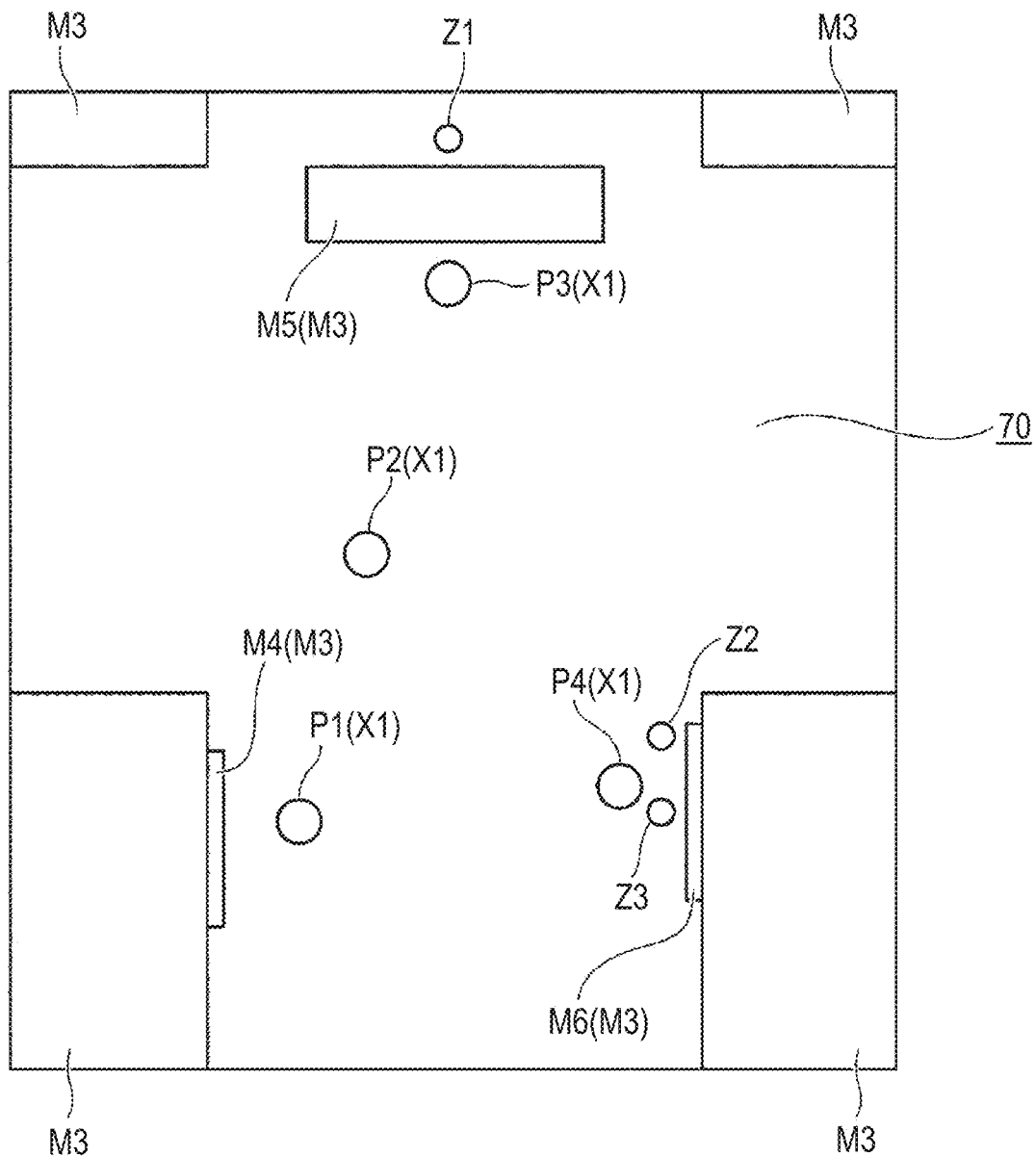
FIG. 5 is a diagram schematically illustrating an internal state in a specific space portion in top view.

FIG. 5 is a diagram schematically illustrating an internal state in a specific space portion 70 in top view. Here, as an example, the specific space portion 70 is set to a lobby space for participating in a mission (or a quest) in a specific game. The specific space portion 70, for example, may be a space portion 70 associated with a star mark in FIG. 4. Note that, as with the case of the specific space portion 70, when the virtual space is the game space, the avatar can also be read as the game medium (for example, a game character according to a player) manipulated by the user.

In FIG. 5, the positions of an avatar X1 according to one user at different time points are schematically illustrated by ○ marks P1(X1) to P4(X1), and the position of the other avatar Z1 (the avatar Z1 as a receptionist) is schematically illustrated by a ○ mark. In addition, in FIG. 5, various second objects M3 are disposed in the space portion 70, and among them, a second object M5 (M3) is set to a reception facility. In addition, the second object M3 is set to a wall. The avatar Z1 as the receptionist functions as a character receiving the play of a mission desired by the user, among various missions. Note that, the avatar Z1 as the receptionist may be automatically operated on the basis of an algorithm such as artificial intelligence (AI), or may be manipulated by a staff user.

In a case where the avatar moves within the specific space portion 70, the scenery in the space portion 70 seen from the avatar is changed in accordance with the movement. Such scenery and the change thereof are transferred to the user as the terminal image as described above.

Figure 6:
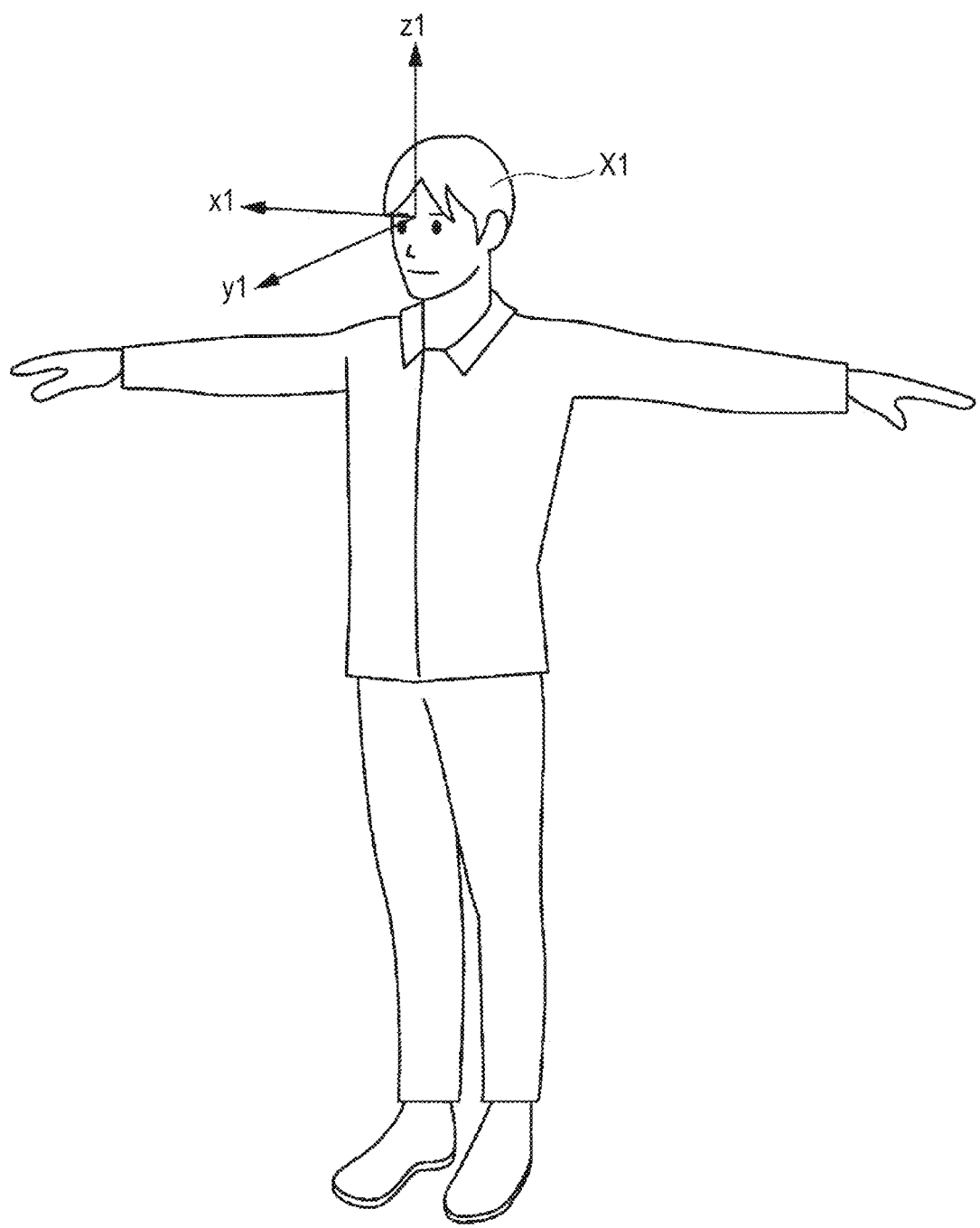
FIG. 6 is an explanatory diagram in the first person.
Figure 7A:
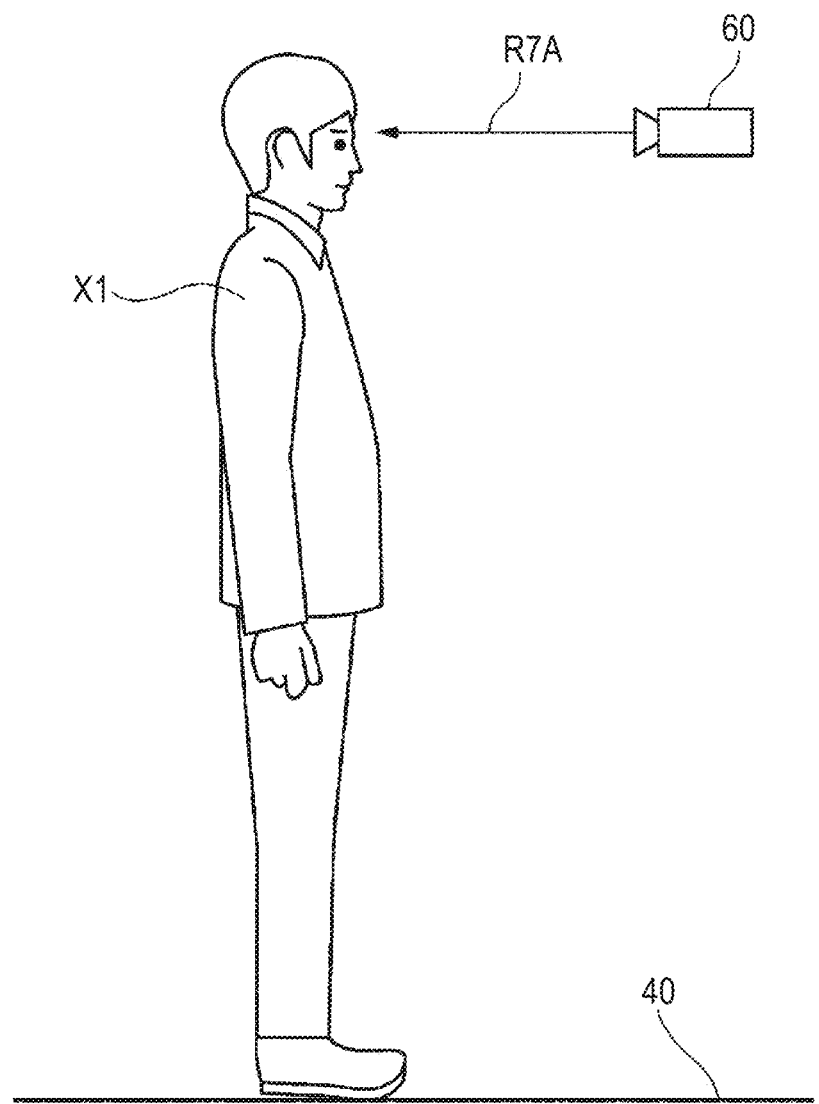
FIG. 7A is an explanatory diagram in another visual line direction according to a virtual camera.
Figure 7B:
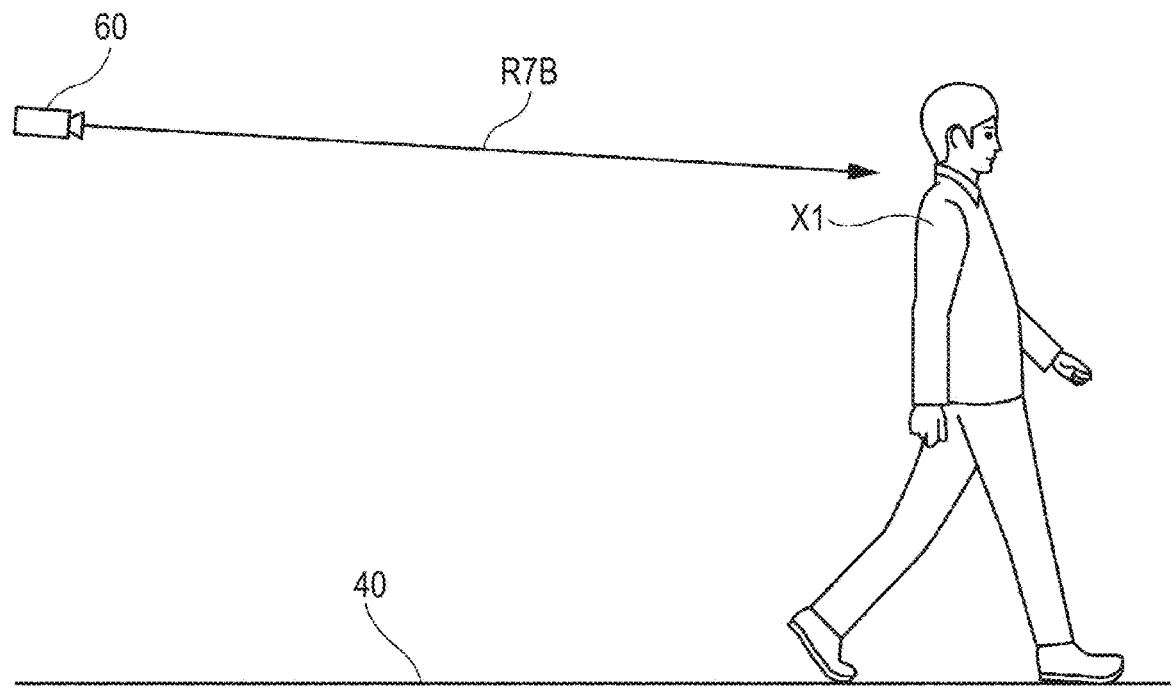
FIG. 7B is an explanatory diagram of still another visual line direction according to the virtual camera.

FIG. 6 to FIG. 7B are explanatory diagrams of a visual line direction of a virtual camera 60 for generating the terminal image. Note that, in FIG. 7A and FIG. 7B, a reference numeral 40 indicates a field object on which the avatar is capable of walking. Basically, a terminal image according to one avatar is drawn in the first person corresponding to the visual line (the direction of the eyes) of the one avatar. In this case, a visual line direction of the avatar, for example, may be calculated by a local coordinate system (x1, y1, z1) as illustrated in FIG. 6. Note that, the visual line direction of the avatar in the first person may be determined in accordance with the direction of the avatar. The direction of the avatar may be the entire direction of the avatar, or may be the direction of a specific part of the avatar (for example, the direction of the face, and the direction of the body), or the like. In addition, as illustrated in FIG. 7A, the visual line direction of the virtual camera 60 may be set to capture the front of the avatar from the front side of the avatar. In addition, as illustrated in FIG. 7B, the visual line direction of the virtual camera 60 may be set to capture the front side of the avatar from behind the avatar. Such various visual line directions of the virtual camera 60 may be switchable by the avatar (the user), or may be automatically switchable in accordance with the movement of the avatar or the surrounding environment.

Figure 8:
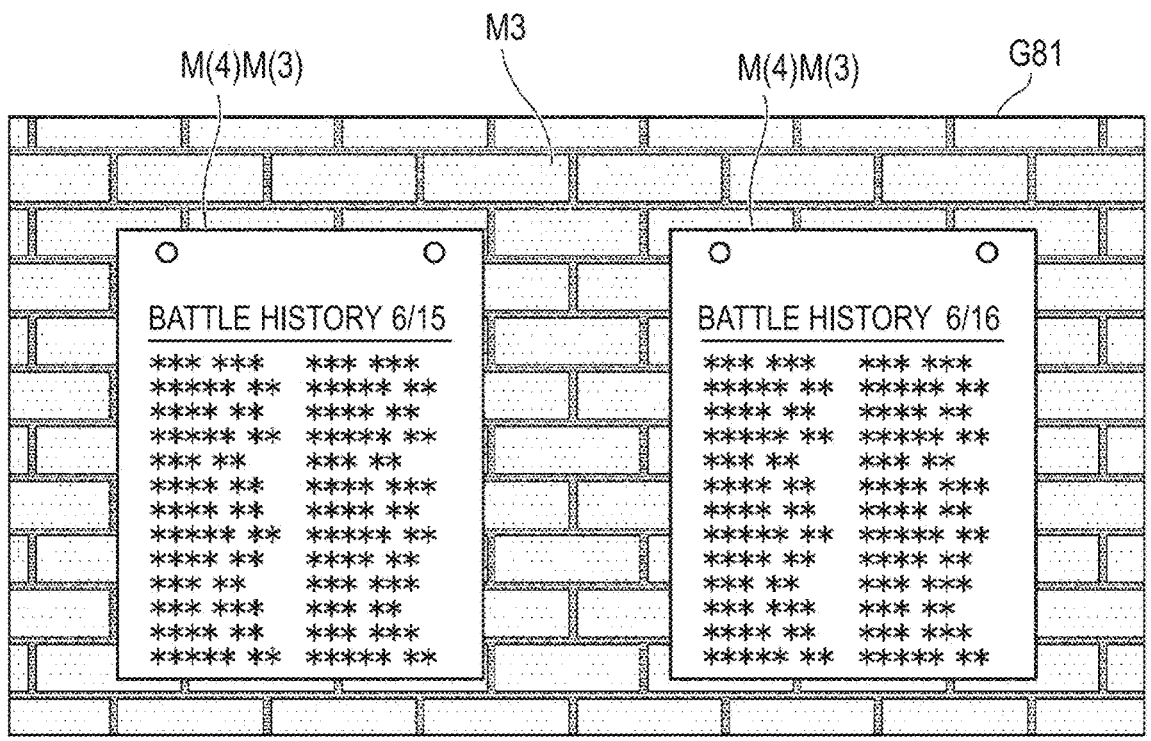
FIG. 8 is a diagram illustrating an example of the terminal image when an avatar is positioned in a position P1(X1) of FIG. 5.

FIG. 8 is a diagram illustrating an example of the scenery in the field of view of the avatar X1 (a terminal image G81 for the user according to the avatar X1) when the avatar X1 is positioned in the position P1(X1) of FIG. 5. In FIG. 8, when the avatar X1 is positioned in the position P1(X1) of FIG. 5, the avatar X1 is capable of seeing a bulletin board on the wall. Here, on the wall that is the second object M3, a bulletin board M4(M3) that is also the second object M3 is installed, and on the bulletin board M4(M3), battle history information associated with a game is posted. In this case, the avatar X1 moves to the position P1(X1) of FIG. 5 to be directed toward the wall side, and thus, is capable of checking the battle history information through the bulletin board M4(M3). Note that, in FIG. 8, the terminal image G81 for the user according to the avatar X1 is in the first person illustrated in FIG. 6, but may be drawn in another visual line direction.

Figure 9:
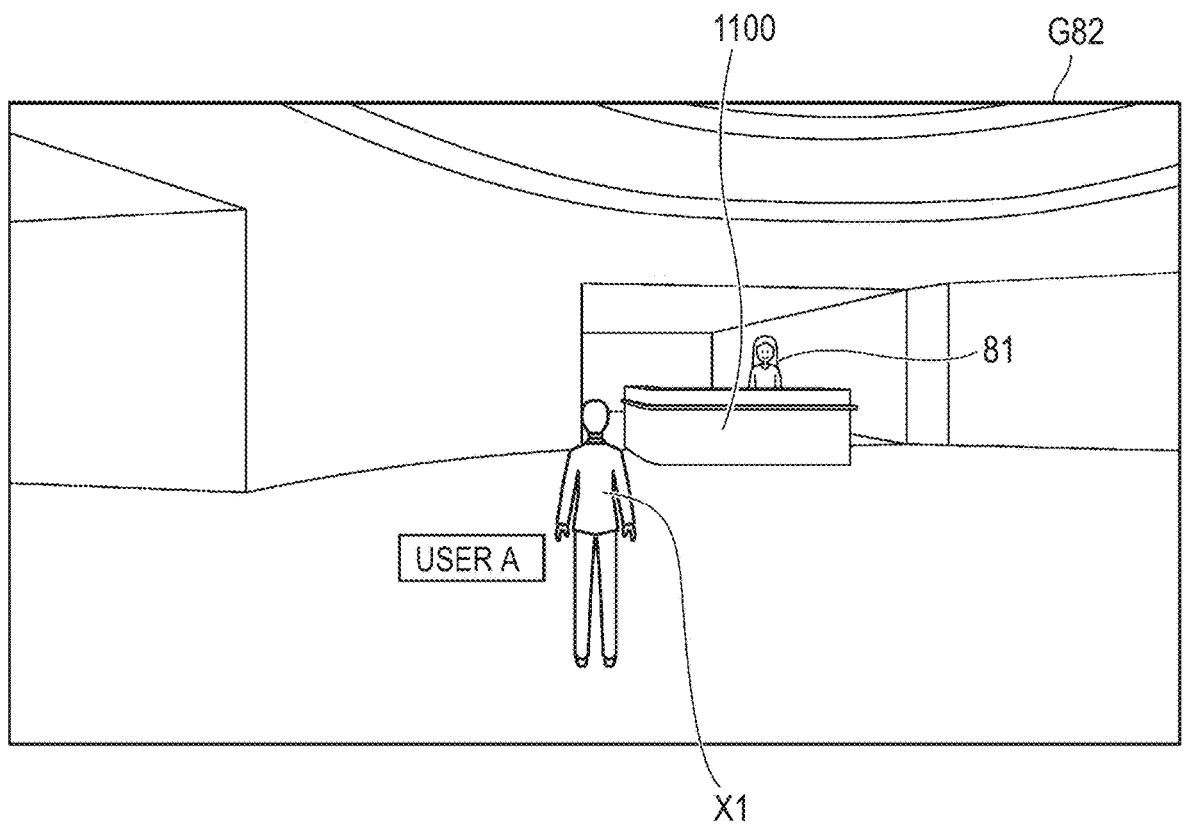
FIG. 9 is a diagram illustrating an example of the terminal image when the avatar is positioned in a position P2(X1) of FIG. 5.

FIG. 9 is a diagram illustrating an example of the scenery in the field of view of the avatar X1 (a terminal image G82 for the user according to the avatar X1) when the avatar X1 is positioned in the position P2(X1) of FIG. 5. In FIG. 9, when the avatar X1 is positioned in the position P2(X1) of FIG. 5, the avatar is capable of facing the reception facility M5(M3) (in FIG. 9, represented by a reference numeral 1100). Note that, in FIG. 9, the terminal image G82 for the user according to the avatar X1 is in a visual line direction R7B of the virtual camera 60 illustrated in FIG. 7B, but may be drawn in another visual line direction.

Figure 10:
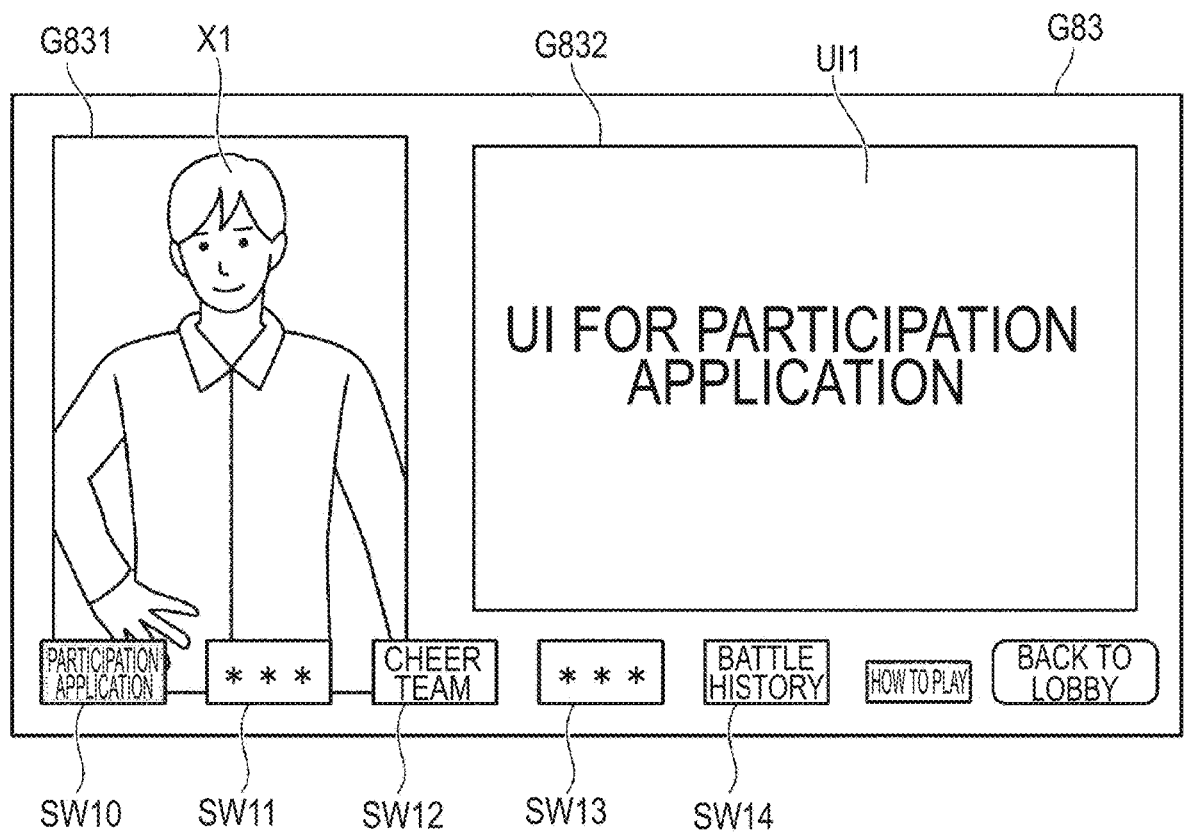
FIG. 10 is a diagram illustrating an example of the terminal image when the avatar is positioned in a position P3(X1) of FIG. 5.

FIG. 10 is a diagram illustrating an example of a terminal image G83 for the user according to the avatar X1 when the avatar X1 is positioned in the position P3(X1) of FIG. 5. As illustrated in FIG. 5, the position P3(X1) is in the vicinity of the reception facility M5(M3) or the avatar Z1 as the receptionist, and corresponds to a region in which the avatar that desires for reception is positioned. In a case where the avatar X1 is positioned in such a region, the visual line direction of the virtual camera 60 may be transitioned from the visual line direction R7B of the virtual camera 60 illustrated in FIG. 7B to a visual line direction R7A of the virtual camera 60 illustrated in FIG. 7A. Accordingly, as illustrated in FIG. 10, the terminal image G83 includes an image G831 of the avatar X1 in front view.

Note that, in FIG. 10, the terminal image G83 for the user according to the avatar X1 is in the visual line direction R7A of the virtual camera 60 illustrated in FIG. 7A, but may be in a visual line direction in which the avatar Z1 as the receptionist can be seen in front. In FIG. 10 (the same applies to FIG. 11 described below), button-type user interfaces SW10 to SW14 are provided on the lower side of the terminal image G83.

In this embodiment, a user interface G832 for participation application is associated with the reception facility M5(M3), and the terminal image G83 includes the user interface G832 for participation application. Accordingly, in a case where the avatar X1 moves to the vicinity of the reception facility M5(M3), the avatar is capable of applying for participation in a mission through the user interface G832 for participation application. Note that, the user interface G832 for participation application may automatically appear in a case where the avatar X1 moves to the vicinity of the reception facility M5(M3), or may appear when a participation application button SW10 is manipulated by the user.

Figure 11:
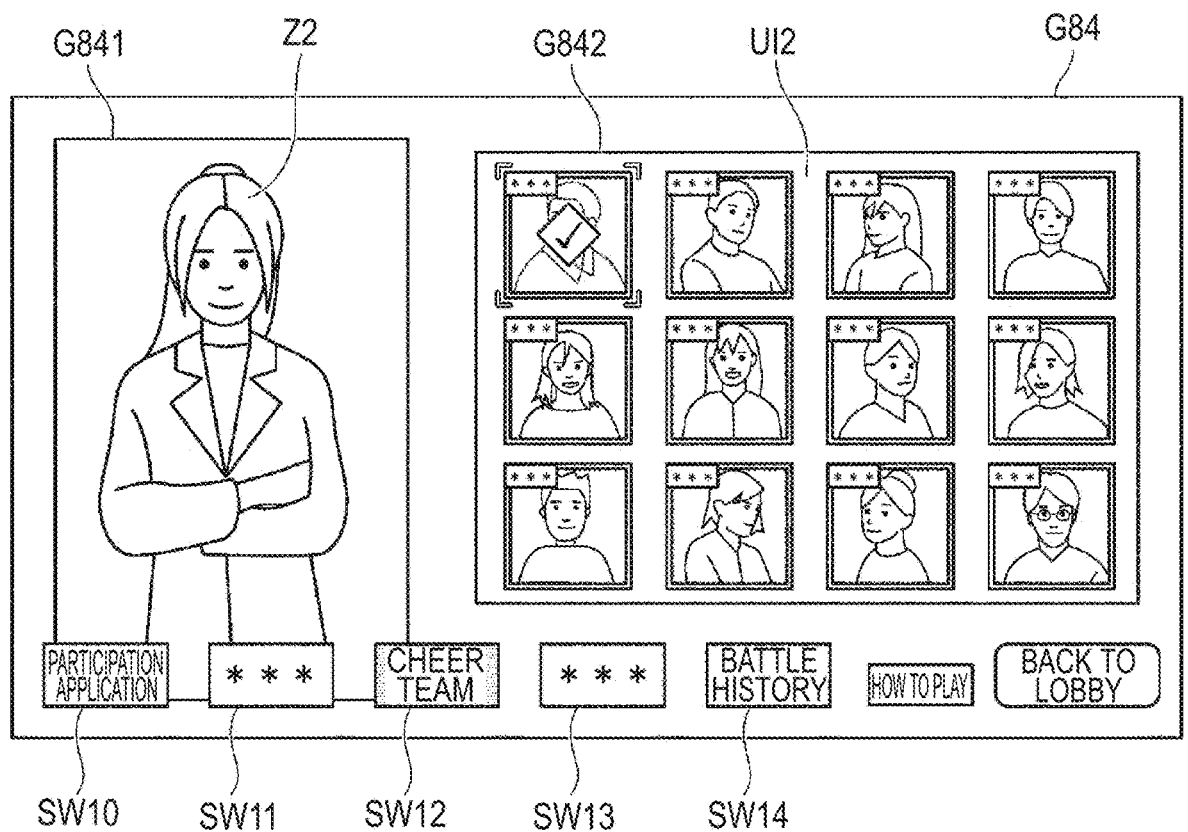
FIG. 11 is a diagram illustrating an example of the terminal image when the avatar is positioned in a position P4(X1) of FIG. 5.

FIG. 11 is a diagram illustrating an example of a terminal image G84 for the user according to the avatar X1 when the avatar X1 is positioned in the position P4(X1) of FIG. 5. As illustrated in FIG. 5, the position P4(X1) is in the vicinity of avatars Z2 and Z3 according to a cheer team, and corresponds to a region in which an avatar that has applied for participation in the recruitment of the cheer team is positioned. In a case where the avatar X1 is positioned in such a region, the visual line direction of the virtual camera 60 may be transitioned from the visual line direction R7B of the virtual camera 60 illustrated in FIG. 7B to the first person viewpoint illustrated in FIG. 6. Accordingly, as illustrated in FIG. 11, the terminal image G84 includes an image G841 of the avatar Z2 according to the cheer team in front view.

In this embodiment, a user interface G842 for setting a cheer team is associated with the avatar Z2 according to the cheer team or the position thereof (or the region), and the terminal image G84 includes the user interface G842 for setting a cheer team. Accordingly, in a case where the avatar X1 moves to the vicinity of the avatar Z2 according to the cheer team, it is possible to set the cheer team through the user interface G842 for setting a cheer team. Note that, the user interface G842 for setting a cheer team may automatically appear in a case where the avatar X1 moves to the vicinity of the avatar Z2 according to the cheer team, or may appear when a cheer team button SW12 is manipulated by the user.

As described above, in the space portion 70 of the lobby, the avatar X1 moves to each position including the position P1(X1), the position P3(X1), the position P4(X1), or the like, described above, and thus, is capable of performing various activities such as obtaining the battle history information, applying for a mission, or setting the cheer team.

However, in the virtual space, as with the space portion 70 of the lobby described above, the avatar is capable of freely moving around, but in a case where a movement destination of the avatar is determined, in order to reduce an input load of the user (and a resultant processing load), it is useful to suitably simplify the movement of the avatar to the movement destination. In addition, in the virtual space, in order to improve an activity efficiency of the avatar, it is useful to effectively improve the manipulability of the avatar or the progress of the activities.

On the other hand, in the case of a specification for usually responding to such requests, a sense of discomfort easily occurs. For example, the avatar at a certain spot A desires to move to another spot B associated with a specific user interface in order to perform a manipulation through the specific user interface, it is also possible to simply allow the avatar to perform an instant movement to the spot B. However, in this case, eventually, at the spot A, there is no significant difference from enabling the manipulation through the specific user interface to be performed, and the feeling of moving within the virtual space may not be obtained, which may easily lead to a sense of discomfort.

Therefore, in this embodiment, as described below, by suitably attaining the transition of the user interface associated with the movement of the avatar in the virtual space, it is possible to reduce the input load of the user (and the resultant processing load) and to improve the activity efficiency of the avatar.

Specifically, in this embodiment, first, a high-speed movement or the instant movement (hereinafter, represented by the "high-speed movement") of the avatar to the position (the spot) associated with the specific user interface can be performed. Then, in such a high-speed movement, the specific user interface in the position of the movement destination slides (appears) in the terminal image from a direction according to a movement direction. Hereinafter, as described above, an event of allowing a user interface of the movement destination to appear together with the high-speed movement will also be referred to as a "UI transition event".

Here, with reference to FIG. 12A to FIG. 13, a changing mode of the terminal image associated with the UI transition event will be described. Here, a preferred example of the changing mode of the terminal image associated with the UI transition event will be described in association with the activities of the avatar X1 in the space portion 70 of the lobby described in FIG. 5 and the like. Note that, naturally, the changing mode of the terminal image associated with the UI transition event described below can also be applied to the activities of the avatar outside the space portion 70 of the lobby.

Figure 12A:
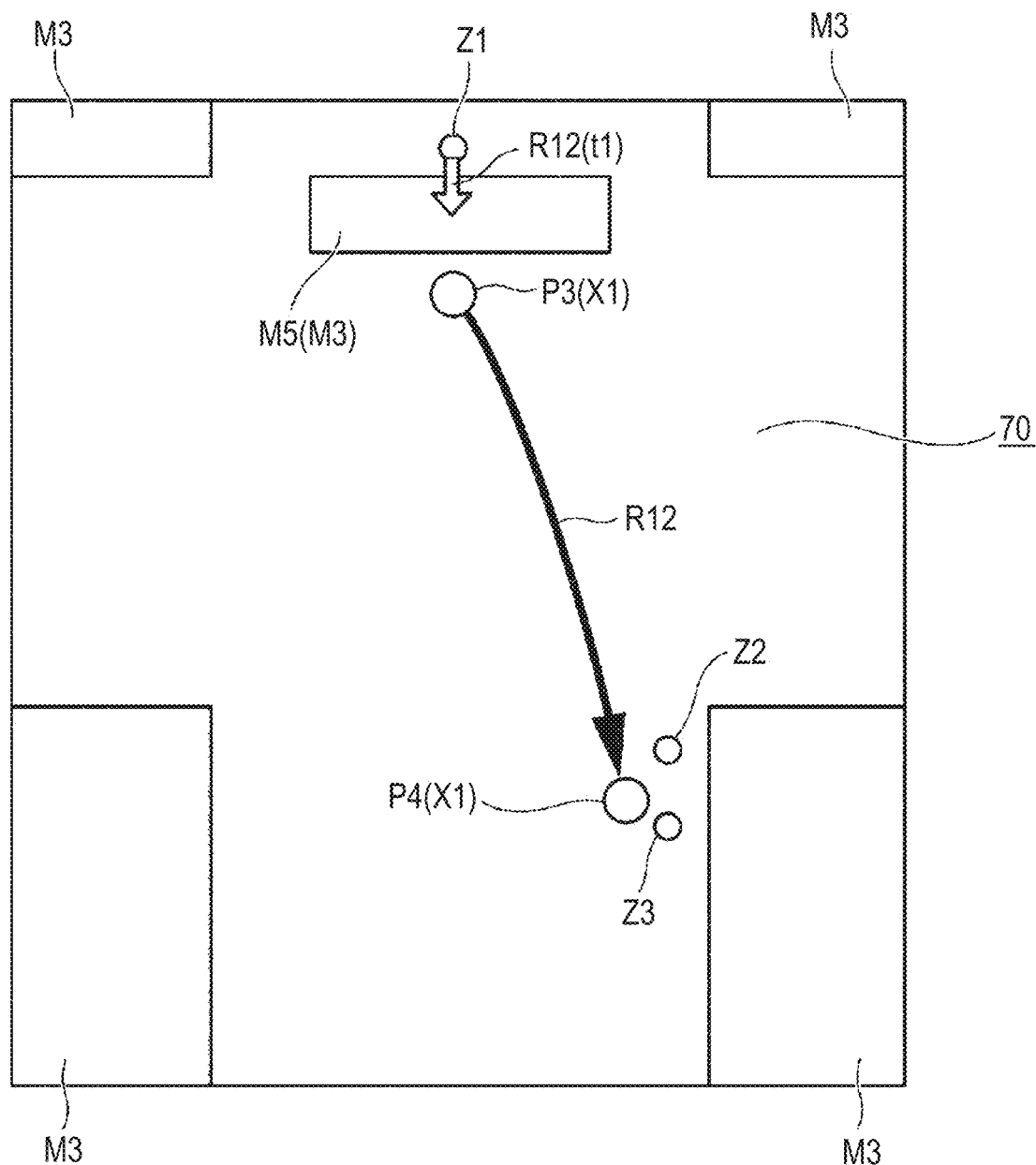
FIG. 12A is a diagram schematically illustrating a movement route of the avatar when performing a high-speed movement from the position P3(X1) to the position P4(X1)
Figure 12B:
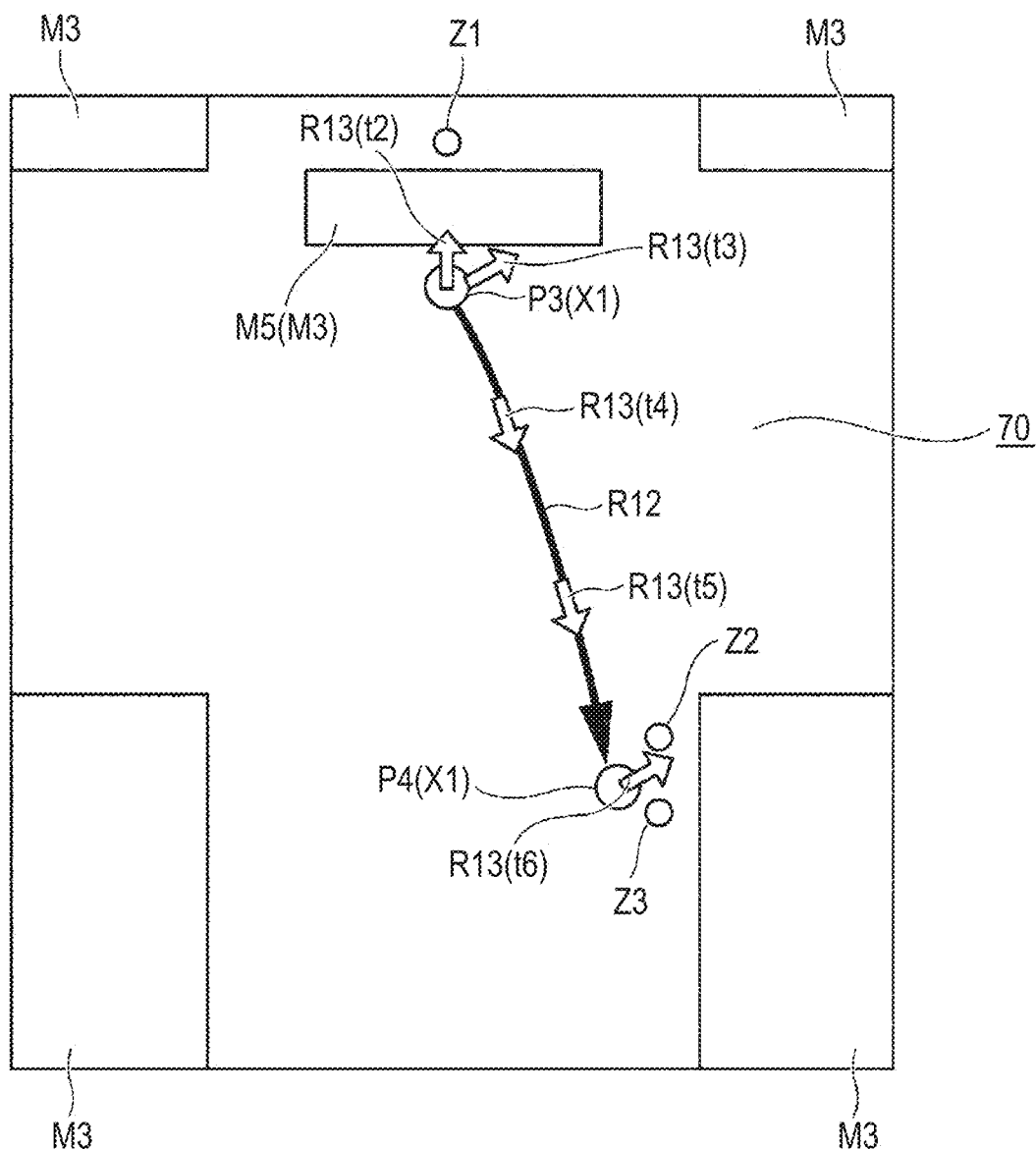
FIG. 12B is a diagram schematically illustrating a changing mode of a visual line direction of the avatar when performing the high-speed movement from the position P3(X1) to the position P4(X1)

FIG. 12A is a diagram schematically illustrating a movement route (refer to R12) of the avatar X1 when performing the high-speed movement from the position P3(X1) to the position P4(X1). FIG. 12B is a diagram schematically illustrating a changing mode of the visual line direction of the avatar X1 (the visual line direction of the virtual camera 60 according to the avatar X1) when performing the high-speed movement from the position P3(X1) to the position P4(X1). FIG. 13 is a diagram schematically illustrating an example of a terminal image G84A at one time point in the middle of the high-speed movement from the position P3(X1) to the position P4(X1).

Here, as an example, when the avatar X1 is positioned in the position P3(X1), and the cheer team button SW12 is manipulated, the UI transition event according to the high-speed movement from the position P3(X1) to the position P4(X1) occurs. In this case, it is not necessary for the avatar X1 to move from the position P3(X1) to the position P4(X1) on foot, which improves convenience. In addition, processing while the avatar X1 is moving on foot can be omitted, and thus, the processing load can be reduced.

In a case where the avatar X1 reaches the position P4(X1) by the high-speed movement from the position P3(X1) to the position P4(X1), the terminal image G84 as illustrated in FIG. 11 is generated. That is, the terminal image according to the avatar X1 is switched from the terminal image G83 (an example of a first terminal image) as illustrated in FIG. 10 to the terminal image G84 (an example of a second terminal image) as illustrated in FIG. 11. Accordingly, the avatar X1 is capable of setting the cheer team through the user interface G842 for setting a cheer team. In this case, it is possible to manipulate the user interface G842 for setting a cheer team associated with the position P4(X1) without the avatar X1 moving from the position P3(X1) to the position P4(X1) on foot. As a result thereof, it is possible to reduce the manipulation load of the user (and the resultant processing load).

As described above, in this embodiment, in conjunction with the high-speed movement of the avatar X1 from the position P3(X1) to the position P4(X1), the user interface of the terminal image is changed in association with the movement from the position P3(X1) to the position P4(X1). That is, the user interface of the terminal image is switched from the user interface (an example of a first user interface) associated with the position P3(X1) (an example of a first position) to the user interface (an example of a second user interface) associated with the position P4(X1) (an example of a second position). Specifically, the user interface of the terminal image is transitioned from the user interface G832 for participation application to the user interface G842 for setting a cheer team.

In addition, in this embodiment, when performing the high-speed movement from the position P3(X1) to the position P4(X1), the visual line direction of the virtual camera 60 is in the first person (accordingly, the same as the visual line direction of the avatar), and thus, as illustrated in FIG. 12B, is changed in approximately the same manner as that when moving from the position P3(X1) to the position P4(X1) on foot. Specifically, in FIG. 12B, in association with each specific position on the movement route (refer to R12) of the avatar X1 when performing the high-speed movement from the position P3(X1) to the position P4(X1), the visual line direction of the virtual camera 60 is schematically illustrated by arrows R13($t2$), R13($t3$), R13($t4$), R13($t5$), and R13($t6$). Note that, for example, ($t2$) of R13($t2$) represents the visual line direction at the corresponding time point $t2$ (a position at the time point $t2$), and the same applies to R13($t3$), R13($t4$), R13($t5$), and R13($t6$). In this case, the visual line direction is set to move on from the time point $t2$ to a time point $t6$. In this case, at a start time point $t2$ of the high-speed movement, the avatar X1 is in the first person (FIG. 6) from the visual line direction R7A (refer to R12($t1$) in FIG. 12A) at the previous time point $t1$ illustrated in FIG. 7A, and is directed toward the front direction. Then, the visual line direction is rotated in accordance with the rotation of the body in a direction directed toward the position P4(X1) (refer to R13($t3$)). After that, a progress direction directed toward the position P4(X1) is rotated to be directed toward a direction (refer to R13($t4$) and R13($t5$)), finally, the direction of the avatars Z2 and Z3 according to the cheer team (refer to R13($t6$)). Note that, in a modification example, a part or all of R13($t2$), R13($t3$), R13($t4$), R13($t5$), and R13($t6$) may be attained by the visual line direction R7B illustrated in FIG. 7B.

The image of the virtual space according to the position and the visual line direction of the virtual camera 60 that are changed as described above may be the terminal image when performing the high-speed movement of the avatar X1 from the position P3(X1) to the position P4(X1), and may be output as an intermediate image according to each intermediate position (positions after the time point $t3$ of FIG. 12B before the time point $t6$). For example, in the example illustrated in FIG. 13, such an intermediate image display region G841A is schematically illustrated. In the intermediate image display region G841A, the intermediate images at a plurality of time points during the high-speed movement are output, and thus, the feeling of performing the high-speed movement can be imparted to the user. As a result thereof, it is possible to reduce a sense of discomfort that is the problem described above. Note that, in the case of performing the high-speed movement of the avatar X1 from the position P3(X1) to the position P4(X1), as illustrated by an arrow R141 in FIG. 13, the scenery of the virtual space described above flows from the right side to the left side, in association with the changing mode of the visual line direction of the virtual camera 60. Note that, here, the intermediate images at the plurality of time points during the high-speed movement are output, but one defined image (one frame) may be output as the intermediate image.

Here, in this embodiment, a switching mode from the user interface associated with the position P3(X1) to the user interface associated with the position P4(X1) is changed on the basis of a positional relationship between the position P3(X1) and the position P4(X1). Accordingly, it is possible to reduce a sense of discomfort that is the problem described above, compared to the case of switching the interface in a constant switching mode regardless of the positional relationship between the position P3(X1) and the position P4(X1).

Figure 13:
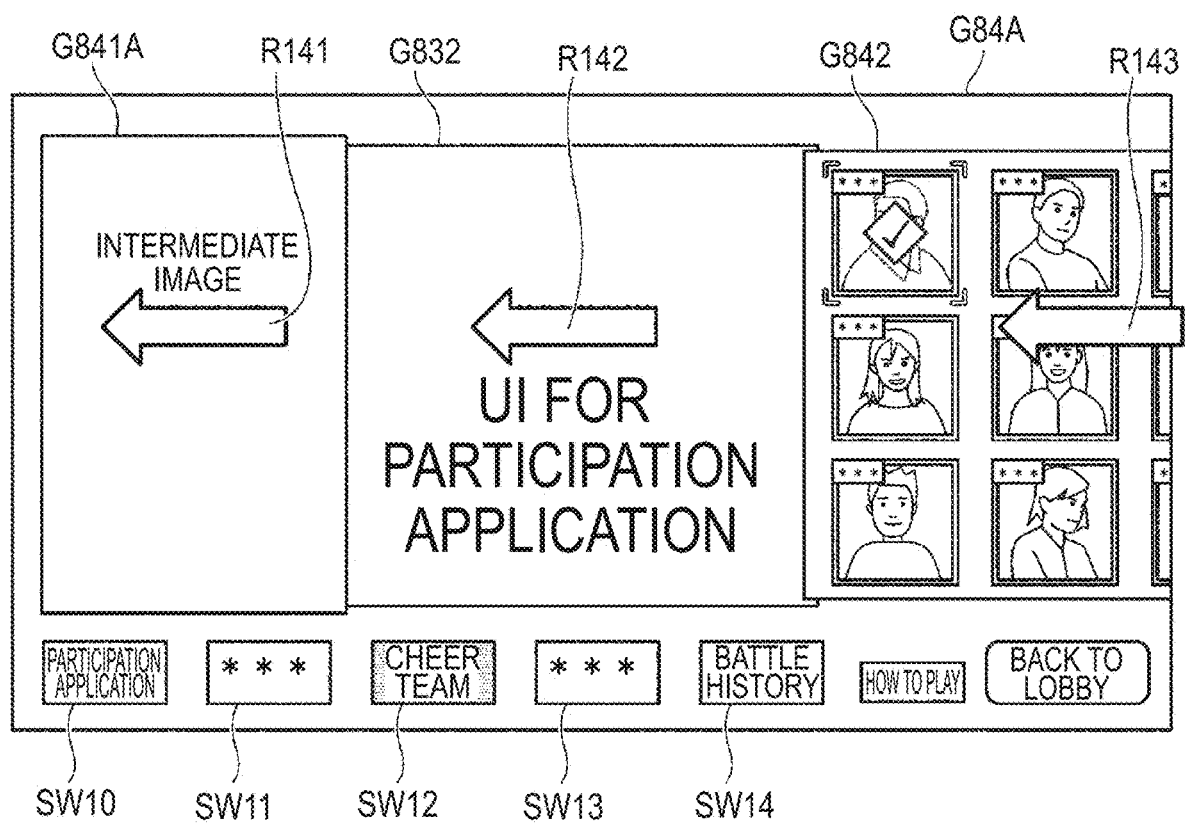
FIG. 13 is a diagram illustrating an example of the terminal image at one time point in the middle of the high-speed movement from the position P3(X1) to the position P4(X1)

Specifically, in this embodiment, since the position P4(X1) is positioned on the right side from the position P3(X1), on the basis of the visual line direction of the virtual camera 60 in the virtual space at the time point $t2$, the user interface associated with the position P4(X1) appears (for example, slides in) from the right side of the terminal image (refer to an arrow R143 in FIG. 13). In addition, the user interface associated with the position P3(X1) disappears (for example, slides out) to the left side of the terminal image (refer to an arrow R142 in FIG. 13).

Note that, even though it is not illustrated, as another example, when the avatar X1 is positioned in the position P3(X1), and manipulates a battle history button SW14, the UI transition event according to the high-speed movement from the position P3(X1) to the position P1(X1) may occur. In this case, since the position P1(X1) is positioned on the left side from the position P3(X1), a user interface (not illustrated) associated with the position P1(X1) may appear (for example, slide in) from the left side of the terminal image. In addition, the user interface associated with the position P3(X1) may disappear (for example, slide out) to the right side of the terminal image.

As described above, in this embodiment, since an appearance mode (a disappearance mode) of the user interface is changed in accordance with a positional relationship between two spots according to the high-speed movement, it is possible to effectively reduce a sense of discomfort that is the problem described above.

In addition, when performing the high-speed movement from the position P3(X1) to the position P1(X1), the scenery of the virtual space flows from the left side to the right side, in association with the changing mode of the visual line direction of the virtual camera on the contrary to the case of performing the high-speed movement of the avatar X1 from the position P3(X1) to the position P4(X1) described above.

Accordingly, according to this embodiment, since the user interface is changed in accordance with the positional relationship between two spots, together with the scenery of the virtual space, it is possible to more effectively reduce a sense of discomfort that is the problem described above.

Note that, here, the movement between two spots associated with the user interface in the space portion 70 of the lobby has been described, but the same may apply to the same movement between two spots in another space portion 70, the same movement between two spots in the free space portion 71, a movement between a spot in the space portion 70 and a spot in the free space portion 71, and the like.

Figure 14:
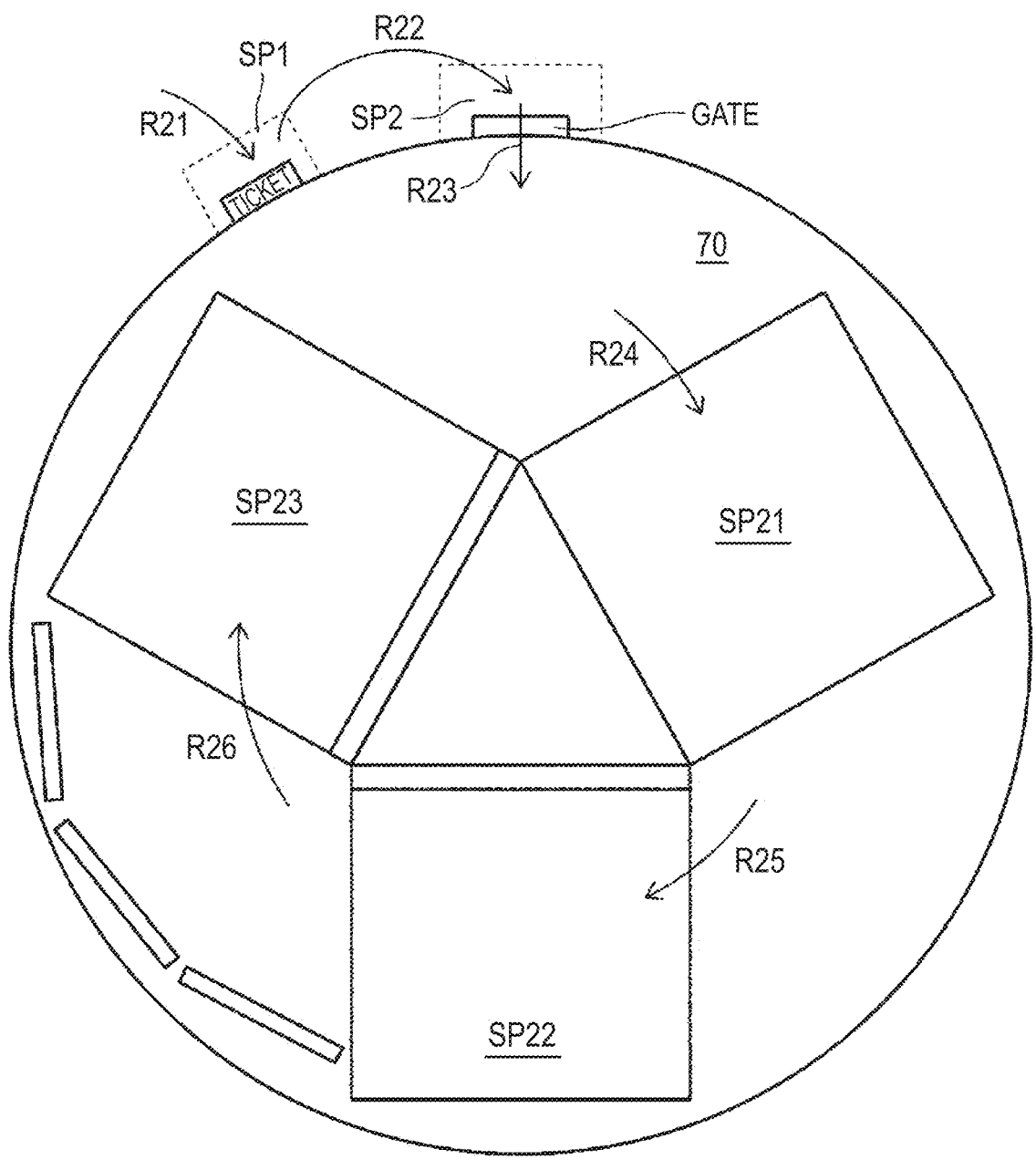
FIG. 14 is an explanatory diagram of an application example in a space portion including a plurality of booths for a presentation.

For example, in the space portion 70 as illustrated in FIG. 14, a plurality of booths SP21 to SP23 for presentation are disposed. In this case, for example, the avatar moves to a space SP1 represented by an arrow R21 to receive a tutorial, and then, moves to a space SP2 in front of a gate (refer to an arrow R22), and thus, is capable of entering the space portion 70 through the gate (refer to an arrow R23). Then, the avatar visits each of the booths SP21 to SP23 in the space portion 70 (arrows R24 to R26), and thus, is capable of receiving various explanations. For example, in the case of a company presentation, each of the booths SP21 to SP23 may be associated with different companies. In this case, a user interface may be associated with each of the booths SP21 to SP23, or any one may be selected from each of the booths SP21 to SP23 such that the UI transition event described above occurs. For example, in a case where the avatar is positioned in the booth SP21 and performs input (predetermined input) for requesting a movement to the booth SP22, a high-speed movement to the booth SP22 may be attained. In this case, the appearance mode of the user interface associated with the booth SP22 in the terminal image may be determined in accordance with a positional relationship between the booth SP21 and the booth SP22. For example, in a case where the booth SP22 is positioned on the right side, on the basis of the front direction of the avatar at this time, the user interface associated with the booth SP22 may appear from the right side of the terminal image. Then, in accordance with this, the user interface associated with the booth SP21 may disappear to the left side of the terminal image.

Figure 15:
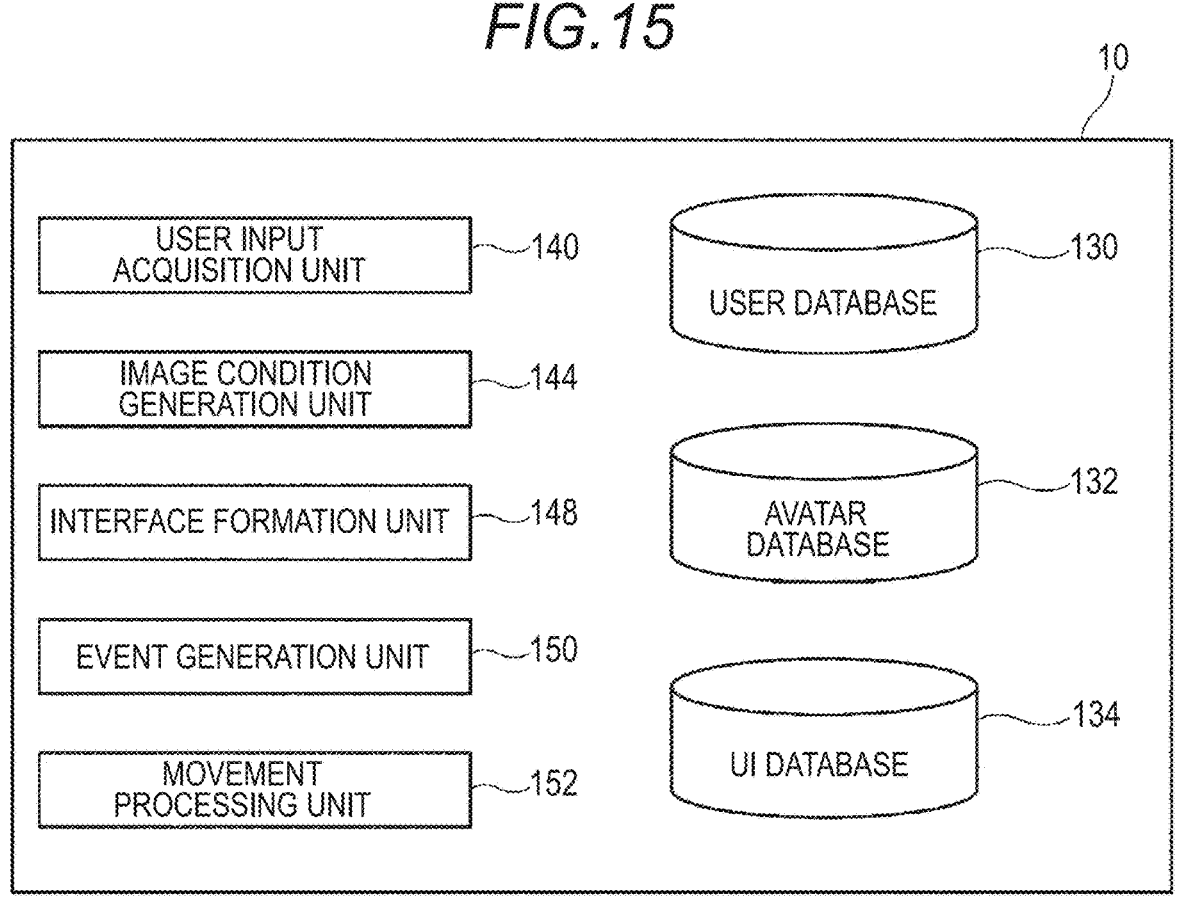
FIG. 15 is an example of a functional block diagram of a server device associated with a UI transition event.

Next, with reference to FIG. 15 and the subsequence, configuration examples of the virtual reality generation system 1 described above, which are associated with the UI transition event, will be sequentially described.

Hereinafter, the server device 10 attains an example of the information processing system, but as described below, each element (refer to the terminal communication unit 21 to the terminal control unit 25 in FIG. 1) of one terminal device 20 may attain an example of the information processing system, or the plurality of terminal devices 20 may attain an example of the information processing system in cooperation. In addition, the server device and one or more terminal devices 20 may attain an example of the information processing system in cooperation.

Figure 16:
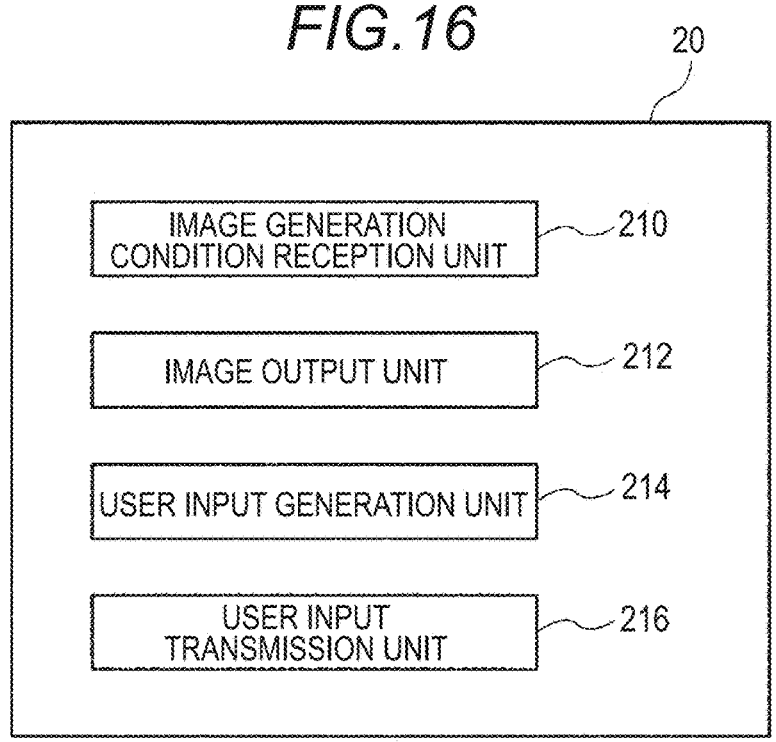
FIG. 16 is an example of a functional block diagram of a terminal device associated with the UI transition event.
Figure 18:
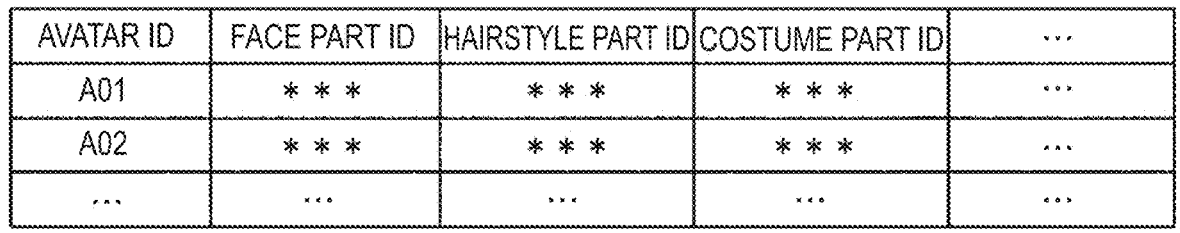
FIG. 18 is an explanatory diagram of data in an avatar database.
Figure 19:
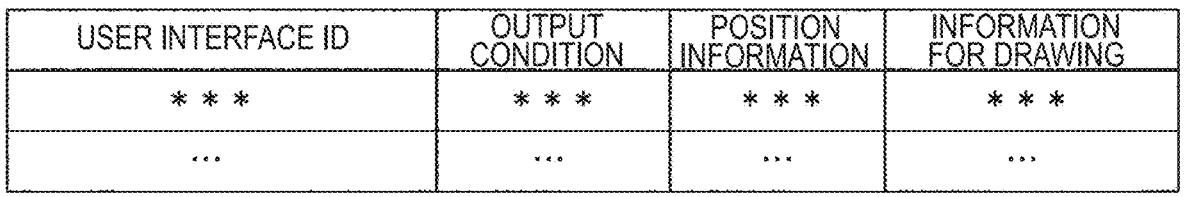
FIG. 19 is an explanatory diagram of data in a UI database.

FIG. 15 is an example of a functional block diagram of the server device 10 associated with the UI transition event described above. FIG. 16 is an example of a functional block diagram of the terminal device 20 associated with the UI transition event described above. FIG. 17 is an explanatory diagram of data in a user database 130. FIG. 18 is an explanatory diagram of data in an avatar database 132. FIG. 19 is an explanatory diagram of data in a UI database 134. Note that, in FIG. 17 to FIG. 19, "***" represents a state in which some information is stored, "–" represents a state in which no information is stored, and " . . . " represents the repetition of the same.

Here, first, the function of the server device 10 will be described, and then, the function of the terminal device 20 will be described.

(Function of Server Device)

As illustrated in FIG. 15, the server device 10 includes the user database 130, the avatar database 132, the UI database 134, a user input acquisition unit 140, an image condition generation unit 144, an interface formation unit 148, an event generation unit 150, and a movement processing unit 152.

Note that, a part or all of the functions of the server device 10 described below may be suitably attained by the terminal device 20 (described below with reference to FIG. 20A to FIG. 22B). In addition, the user input acquisition unit 140 to the movement processing unit 152 are divided for convenience of description, and a part of a function unit may attain the function of another function unit. The same applies to the division of the user database 130, the avatar database 132, and the UI database 134. For example, a part or all of the data in the user database 130 may be combined with the data in the avatar database 132, or may be stored in another database.

The user input acquisition unit 140 to the movement processing unit 152 can be attained by the server control unit 13 of the server device 10 executing one or more programs in the server storage unit 12 of the server device 10. In addition, the user database 130, the avatar database 132, and the UI database 134 can be attained by the server storage unit 12 of the server device 10.

In the user database 130, user information 600 is stored. In the example illustrated in FIG. 17, in the user information 600, a user name, an avatar ID, position/direction information, and the like are associated with each user ID. The user name is a name registered by the user oneself, and is optional. The avatar ID is an ID for specifying the avatar. The position/direction information includes position information and direction information of the avatar. The position information of the avatar may be managed by a coordinate system associated with the virtual space. The direction information may be information indicating the direction of the avatar. Note that, the position/direction information or the like is information that can be dynamically changed in accordance with the manipulation input from the user. In addition to the position/direction information, information indicating the movement of the hands, feet, or the like of the avatar, or information indicating the facial expression or the like may be included.

The user information 600 may further include a rank, information relevant to an owned game medium, information relevant to a used game medium, and friend information, as user information associated with a game.

The rank is a parameter indicating the level of skill of the user relevant to the game. In this embodiment, the value of the rank may increase in accordance with the play of the game by the user. As the rank increases, the level of skill of the user relevant to the game increases.

The information relevant to the owned game medium includes various information pieces unique to a game medium (the owned game medium) owned by the user in the user. In a case where the game medium is acquired by the user, the game medium is associated with the user as the owned game medium. The details of the information relevant to the owned game medium will be described below.

The information relevant to the used game medium is information indicating the game medium that is used by the user in a multiplayer game part. The game medium is selected from the owned game media. Note that, the game medium may function as the avatar described below.

The friend information indicates a user ID in a friend relationship. For example, in a case where a user A is in a friend relationship with users B and C, the friend information associated with the user A includes the user ID of the users B and C. Note that, the friend relationship is attained through a friend request or the like. As described above, the friend information includes the user ID of another user unidirectionally or bidirectionally associated with the user. Note that, the users in the friend relationship, for example, may be capable of performing communication such as the transmission and reception of messages on the virtual reality generation system 1.

The contents of the information relevant to the user are not limited to the above description. For example, the information relevant to the user may further include information indicating a predetermined point possessed by the user in the game. The point is consumed for the user to play the game part. For each game part, the amount of point consumed may be different. The point, for example, may increase in accordance with time elapsing or in accordance with the use of a predetermined game medium.

In the avatar database 132, avatar information 700 relevant to the avatar is stored. In the example illustrated in FIG. 18, in the avatar information 700, the face, the hairstyle, the costume, and the like are associated with each avatar ID. Information according to an appearance such as the face, the hairstyle, and the costume is a parameter characterizing the avatar, and may be set in advance, or may be set by each user. For example, an ID may be applied for each type of information according to the appearance such as the face, the hairstyle, and the costume according to the avatar. In addition, for the face, each part ID may be prepared for various types such as the shape of the face, the eyes, the mouth, and the ears, information according to the face may be managed by combining the IDs of each part configuring the face. In this case, the information according to the appearance such as the face, the hairstyle, and the costume may function as the drawing information of the avatar. That is, it is possible to draw each avatar not only in the server device 10 but also on the terminal device 20 side, on the basis of each ID according to the appearance associated with each avatar ID.

As described above, in this embodiment, basically, one user ID is associated with one user, and an avatar ID is associated with one user ID. Accordingly, a state in which certain information is associated with one user, a state in which the information is associated with the one user ID, and a state in which the information is associated with the avatar ID associated with the one user ID are synonymous with each other. Note that, two or more avatar IDs may be associated with one user ID.

In the UI database 134, user interface information according to the user interface associated with the position information in the virtual space is stored. For example, the user interfaces G832 and G842 described above with reference to FIG. 10 and FIG. 11 may be associated with the second object M5(M3) of the reception facility illustrated in FIG. 5 and a second object M6(M3) according to the wall in the vicinity of the cheer team, respectively. Hereinafter, as described above, the user interface associated with the position information in the virtual space will also be referred to as a "specific user interface". Note that, the specific user interface may include a user interface associated with a specific avatar. For example, the user interface G842 described above may be associated with the avatars Z2 and Z3 according to the cheer team. Even in this case, the user interface G842 is indirectly associated with the position information of each of the avatars Z2 and Z3 according to the cheer team.

For example, user interface information 800 illustrated in FIG. 19 may include an output condition, interface position information, and information for drawing, for each user interface ID. The user interface ID is an ID that is automatically generated when each of the specific user interfaces is generated. The output condition indicates an output condition of the user interface. Any output condition of the user interface, for example, may be satisfied in a case where an avatar in a predetermined region is positioned or in a case where an avatar in a predetermined region is positioned and there is predetermined calling input from the avatar. In this case, the predetermined region may be a region in the vicinity of a position based on the interface position information. For example, the interface position information is position information of the associated second object M3 or a specific avatar (position information in the virtual space). For example, the interface position information according to the user interfaces G832 and G842 described above with reference to FIG. 10 and FIG. 11 may correspond to position information of the second object M5(M3) of the reception facility illustrated in FIG. 5 and position information of the second object M6(M3) according to the wall in the vicinity of the cheer team. Note that, position information according to an object of which object attribute is a movable object may be suitably updated. The information for drawing may include information required for drawing each of the specific user interfaces.

The user input acquisition unit 140 acquires various input pieces by each of the users that are input through the input unit 24 of the terminal device 20.

The image condition generation unit 144 generates an image generation condition for a terminal image that is visible to the user. Note that, as described above, the terminal image may be visible to the user through the display unit 23 of the terminal device 20.

The image condition generation unit 144 generates the image generation condition for a terminal image such that the terminal image is drawn on the basis of a virtual space image. Here, an image generation condition for a terminal image for one user (avatar) will be described. Accordingly, the other avatar indicates an avatar other than the avatar according to the one user.

The image condition generation unit 144 generates the image generation condition for drawing the terminal image, on the basis of position information of one avatar (refer to the position/direction information in FIG. 17). Note that, as the visual line direction of the virtual camera, one visual line direction may be used among various visual line directions described above with reference to FIG. 6 to FIG. 7B.

In addition, the image condition generation unit 144 generates an image generation condition for drawing the other avatar on the terminal image. In this case, the image condition generation unit 144 may generate the image generation condition for drawing the other avatar on the terminal image, in accordance with position information of the other avatar (refer to the position/direction information in FIG. 17). For example, in a case where the position information of the other avatar belongs to the space portion illustrated in the terminal image or is positioned in the field of view of the virtual camera 60, the image condition generation unit 144 may generate the image generation condition for drawing the other avatar on the terminal image.

The image condition generation unit 144 may use the avatar information 700 (refer to FIG. 18) associated with the corresponding avatar ID in the avatar database 132 when generating the image generation condition for drawing the other avatar. In addition, in this case, an image generation condition for expressing the direction of the other avatar may be generated on the basis of position/direction information of the corresponding avatar ID in the user database 130.

In addition, the image condition generation unit 144 generates an image generation condition for drawing a specific item (for example, a specific item associated with a game reward) on the terminal image. In this case, the image condition generation unit 144 may generate the image generation condition for drawing the specific item on the terminal image, in accordance with position information of the specific item. For example, in a case where the position information of the specific item belongs to the space portion illustrated in the terminal image or is positioned in the field of view of the virtual camera 60, the image condition generation unit 144 may generate the image generation condition for drawing the specific item on the terminal image.

In addition, the image condition generation unit 144 generates an image generation condition for drawing a terminal image according to the UI transition event. In this case, as described above with reference to FIG. 12A, FIG. 12B, and the like, in the UI transition event, the image condition generation unit 144 determines the specific user interface that is an output target, in cooperation with the interface formation unit 148, and generates the image generation condition for drawing the specific user interface that is the output target, such as an appearance direction. In addition, in the UI transition event, the image condition generation unit 144 determines position information of the movement destination, in cooperation with the movement processing unit 152, and generates an image generation condition for drawing the terminal image at the movement destination. Note that, in a case where there is the other avatar in the field of view of the virtual camera 60 at the movement destination, as described above, the image condition generation unit 144 may generate the image generation condition for drawing the other avatar on the terminal image.

Note that, as illustrated in FIG. 13 and the like, the image condition generation unit 144 may generate the image generation condition such that the user interface is positioned on the right side of the terminal image, and a virtual space image portion is on the left side of the terminal image when generating the image generation condition for drawing the terminal image according to the UI transition event.

The interface formation unit 148 executes the determination of the necessity of the output of the specific user interface, the determination of an interface that is an output target, and the like, on the basis of the data in the UI database 134.

In a case where an event generation condition according to the UI transition event is established, the event generation unit 150 allows the UI transition event to occur. As described above with reference to FIG. 12A to FIG. 13, and the like, the UI transition event is an event that occurs in accordance with the movement of the avatar, and causes a new specific user interface to appear. Accordingly, the event generation condition according to the UI transition event, for example, may be satisfied in a case where Condition Elements (1) and (2) described below are satisfied. Alternatively, the event generation condition according to the UI transition event may be satisfied in a case where Condition Element (2) is satisfied. In this case, when Condition Element (2) is satisfied, a high-speed movement according to Condition Element (1) is automatically executed, and thus, Condition Element (1) may be automatically satisfied.

Condition Element (1): A high-speed movement to the other spot occurs on the basis of predetermined user input at one spot.

Condition Element (2): A specific user interface is associated with the other spot.

Hereinafter, one spot according to the UI transition event will also be referred to as a "movement source spot", and the other spot will also be referred to as a "movement destination spot". Note that, the specific user interface may be or may not be associated with the movement source spot.

Any predetermined user input in Condition Element (1), for example, as described above with reference to FIG. 10 to FIG. 13, may be the manipulation of a specific button (in the example described above with reference to FIG. 10 to FIG. 13, a "cheer team" button) of the specific user interface to be output at the movement source spot. Here, the predetermined user input can be varied, and may be attained through voice input or gesture input.

The movement processing unit 152 changes the position and the direction of each of the avatars, on the basis of various input pieces from each of the users. The input of the user for changing the position and the direction of the avatar may be varied, or may be different for each terminal device 20. The position information of the avatar according to one user may be changed by manipulation input of a physical switch such as a specific key (for example, a "WASD" key), or may be changed by input indicating the movement of the one user based on a motion capture technology. In addition, the position information of the avatar according to one user may be specified on the basis of the position of the one user in the real space. Hereinafter, the user input for changing the position information of the avatar will also be referred to as "movement manipulation input", and the user input for changing the direction information of the avatar will also be referred to as "direction manipulation input".

The movement processing unit 152 changes the position information or the direction information of the avatar in the virtual space, on the basis of the movement manipulation input (an example of first input) or the direction manipulation input from the user that is acquired by the user input acquisition unit 140. In this embodiment, as an example, the position information and the direction information of the avatar in the virtual space are managed by the coordinate system associated with the virtual space. Note that, the position information of the avatar in the virtual space basically corresponds to a drawing position of the avatar in the image generation condition for a terminal image that is generated by the image condition generation unit 144, but is not necessarily constantly coincident with the drawing position. For example, in a specific situation, an image generation condition may be generated in which the position information of the avatar is not changed, but the drawing position of the avatar in the terminal image is changed. The same applies to the direction information.

The movement processing unit 152 may change the position information of the avatar freely (without any restriction) in the virtual space, on the basis of the movement manipulation input from the user, and preferably may change the position information of the avatar in a predetermined constraint condition. Any predetermined constraint condition, for example, may be set such that a movement that is clearly contrary to a physical phenomenon in the real space (for example, a movement to penetrate through the wall of the building) is prohibited.

In this embodiment, the movement processing unit 152 changes the position of the avatar to the movement destination spot according to the UI transition event, in response to the UI transition event described above, regardless of the movement manipulation input. In this case, a movement route is as described above with reference to FIG. 12A. A movement time may be changed in accordance with a movement distance, but may be adapted to be shorter than the shortest movement time that can be attained by normal movement manipulation input. In addition, the movement processing unit 152 may change the direction of the avatar to a direction according to the movement destination spot according to the UI transition event, in response to the UI transition event described above, regardless of the direction manipulation input. In this case, the direction according to the movement destination spot may be a direction in which the second object M3 or the specific avatar according to the position information associated with the specific user interface of the movement source spot is in front view.

(Function of Terminal Device)

As illustrated in FIG. 16, the terminal device 20 includes an image generation condition reception unit 210, an image output unit 212, a user input generation unit 214, and a user input transmission unit 216.

The image generation condition reception unit 210 receives the image generation condition for a terminal image that is generated by the image condition generation unit 144 of the server device 10 described above.

The image output unit 212 draws the terminal image, on the basis of the image generation condition for a terminal image that is received by the image generation condition reception unit 210, and outputs the drawn terminal image onto the display unit 23 described above. For example, the image output unit 212 may parse the image generation condition for a terminal image as a query parameter to be stored in a variable, and may perform input as an argument to a given API method, the selection of the avatar information, and the like, and thus, may draw the terminal image. Note that, image data (HTML Document+Image) may be generated by the server device 10, on the basis of the image generation condition, and the terminal device 20 may draw a display screen including an image captured on the basis of the image data (HTML Document+Image) received from the server device 10 on the display unit 23 without directly drawing an image from the image generation condition itself. In addition, the terminal device 20 may attain a high-speed update of the terminal image by having a virtual document object model (DOM) function.

The user input generation unit 214 acquires various input pieces from the user, and generates signals according to various input pieces. Specifically, the user input generation unit 214 generates the signals according to various input pieces to be input through the input unit 24 described above.

The user input transmission unit 216 transmits the signal received by the user input generation unit 214 to the server device 10. In this case, the server device 10 receives such a signal, and thus, acquires various input pieces of the corresponding user.

However, function sharing between the server device 10 and the terminal device 20 described above is merely an example, and as described above, various changes can be made. That is, a part or all of the functions of the server device 10 may be suitably attained by the terminal device 20.

Figure 20A:
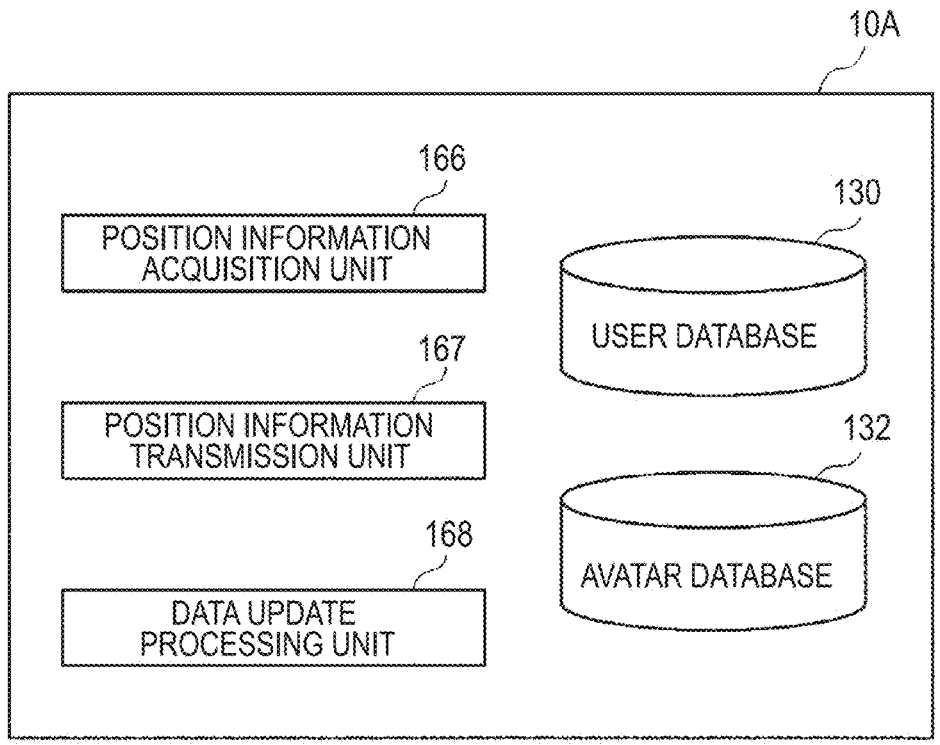
FIG. 20A is an explanatory diagram illustrating another example of a sharing mode between the server device and the terminal device.
Figure 20B:
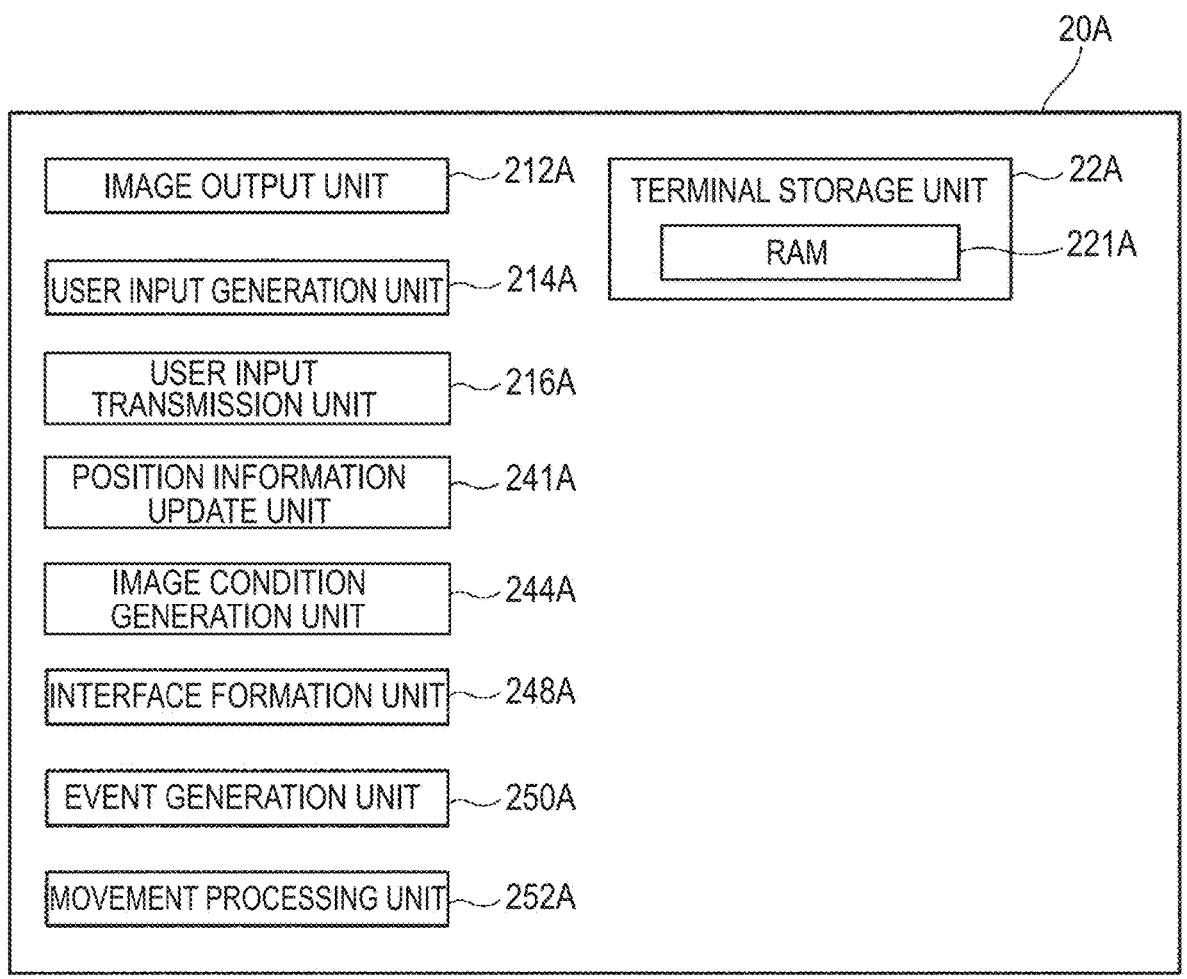
FIG. 20B is an explanatory diagram illustrating another example of the sharing mode between the server device and the terminal device.

For example, a sharing mode as illustrated in FIG. 20A and FIG. 20B may be attained. Even in such a case, a server device 10A and a terminal device 20A of each user cooperate with each other to attain the same function as that in a case where the server device 10 and the terminal device 20 described above cooperate with each other. In the case of the sharing mode as illustrated in FIG. 20A and FIG. 20B, each of the functions of the image condition generation unit 144, the interface formation unit 148, the event generation unit 150, and the movement processing unit 152 can be performed by each browser in the terminal device 20A, as described below.

In the example illustrated in FIG. 20A, the server device 10A includes the user database 130, the avatar database 132, a position information acquisition unit 166, a position information transmission unit 167, and a data update processing unit 168. Note that, the position information acquisition unit 166, the position information transmission unit 167, and the data update processing unit 168 can be attained by the server control unit (refer to the server control unit 13 in FIG. 1) of the server device 10A executing one or more programs in the server storage unit (refer to the server storage unit 12 in FIG. 1) of the server device 10A.

The position information acquisition unit 166 acquires the position/direction information of each of the avatars by receiving the information from the terminal device 20A. In a case where the position/direction information of each of the avatars is acquired, the position information acquisition unit 166 updates the stored data in the user database 130. As illustrated in FIG. 17, the position/direction information for each avatar ID may be stored in the user database 130.

The position information transmission unit 167 transmits the position/direction information of the avatar in the user database 130 to the terminal device 20A that is a transmission target. The terminal device 20A that is the transmission target of the position/direction information of one avatar includes the terminal device 20A of the user according to the other avatar including the one avatar in the field of view. Accordingly, the terminal device 20A according to each of the users is capable of obtaining the position/direction information of each of the avatars according to the other user that is a target to be drawn in the terminal image. In this case, the position/direction information is not transmitted to an unnecessary avatar that is not a drawing target, and thus, it is possible to reduce a communication load.

The data update processing unit 168 transmits update data to the terminal device 20A of each of the users, on the basis of the data in the user database 130 or the avatar database 132. Note that, a transmission timing of the update data may be suitably set, or may include a timing according to a request from the terminal device 20A.

The terminal device 20A illustrated in FIG. 20B is preferable in a case where the virtual reality application is in the form of a Web application that can be used on a browser. The terminal device 20A includes an image output unit 212A, a user input generation unit 214A, and a user input transmission unit 216A. The image output unit 212A, the user input generation unit 214A, and the user input transmission unit 216A may substantially the same as the image output unit 212, the user input generation unit 214, and the user input transmission unit 216 described above, with reference to FIG. 16. Note that, the image output unit 212A draws the terminal image, on the basis of the image generation condition for a terminal image that is generated by the image condition generation unit 244A described below, and outputs the drawn terminal image onto the display unit 23 described above.

Further, in the example illustrated in FIG. 20B, the terminal device 20A includes a position information update unit 241A, an image condition generation unit 244A, an interface formation unit 248A, an event generation unit 250A, a movement processing unit 252A, and a terminal storage unit 22A.

Hereinafter, the terminal device 20A according to one of any user (hereinafter, also referred to as "this user") will be described, but substantially the same applies to the terminal device 20A according to the other user. In addition, hereinafter, an avatar according to this user will also be referred to as this avatar.

Each unit of the position information update unit 241A to the movement processing unit 252A can be attained by the terminal control unit (refer to the terminal control unit 25 in FIG. 1) of the terminal device 20A executing the virtual reality application according to this embodiment that is a program in the terminal storage unit (refer to the terminal storage unit 22 in FIG. 1) of the terminal device 20A. In addition, temporary storage of various data pieces required in the terminal device 20A can be attained by a random access memory (RAM) 221A in the terminal storage unit 22A. In the RAM 221A, various data pieces are decompressed as a temporary storage function, but for example, various data pieces are downloaded on the basis of an HTML document created in the server device 10A, and the data is temporarily decompressed in the RAM 221A and used in processing (drawing or the like) on the browser. In a case where the browser is closed, the data decompressed in the RAM 221A is deleted.

Among the data in the user database 130 of the server device 10A described above (refer to FIG. 17), only data relevant to each of the other avatars positioned in the field of view of this avatar may be stored in the RAM 221A, or the other data may be further stored. Among the data in the RAM 221A, the data of the position/direction information is updated by the position information update unit 241A, on the basis of the position/direction information transmitted from the server device 10A. Note that, among the data in the RAM 221A, the other data may be suitably updated on the basis of the update data described above (for example, when activating the virtual reality application according to this embodiment) through the communication with the server device 10A.

Among the data in the avatar database 132 of the server device 10 described above (refer to FIG. 18), only the data relevant to each of the other avatars positioned in the field of view of this avatar may be stored in the RAM 221A, or the other data may be further stored. The data in the RAM 221A may be updated on the basis of the update data described above through the communication with the server device 10A when activating the virtual reality application (for example, the Web application).

The position information update unit 241A updates the data of the position/direction information among the data in the RAM 221A, on the basis of the received data from the server device 10A as described above. In addition, the position information update unit 241A may update the data of the position/direction information according to this user among the data in the RAM 221A, on the basis of the movement manipulation input or the direction manipulation input from this user.

The image condition generation unit 244A attains the same function as that of the image condition generation unit 144 of the server device 10 described above. The image condition generation unit 244A may transmit the generated image generation condition to the server device 10A. In this case, the image generation condition can also be stored on the server device 10A side.

The interface formation unit 248A attains the same function as that of the interface formation unit 148 of the server device 10 described above. Here, the interface formation unit 148 performs processing relevant to the terminal image for this user.

The event generation unit 250A attains the same function as that of the event generation unit 150 of the server device 10 described above.

The movement processing unit 252A attains the same function as that of the movement processing unit 152 of the server device 10 described above. In this case, the movement processing unit 252A may attain the same function as that of the movement processing unit 152, on the basis of the various input pieces (the signals according to various input pieces that are generated by the user input generation unit 214A) from this user.

Figure 21:
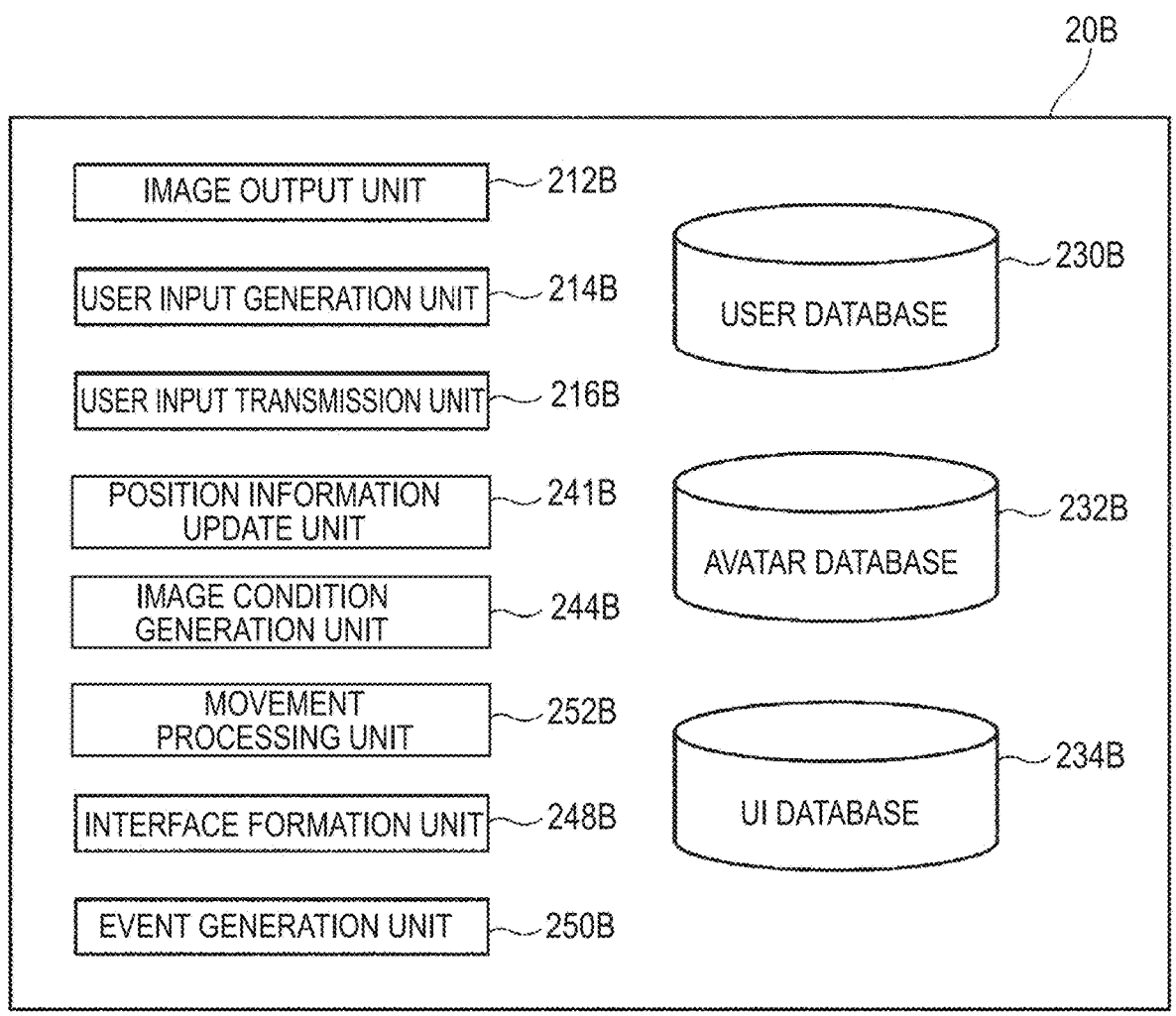
FIG. 21 is a functional block diagram of a terminal device that may be attained instead of the terminal device illustrated in FIG. 20B.

FIG. 21 is a functional block diagram of the terminal device 20B that may be attained instead of the terminal device 20A illustrated in FIG. 20B. The configuration according to FIG. 21 is preferable in a case where the virtual reality application is in the form of a native application different from the Web application that can be used on the browser. Note that, the native application is used by being downloaded in advance on the terminal device 20B.

In the example illustrated in FIG. 21, the terminal device 20B includes an image output unit 212B, a user input generation unit 214B, and a user input transmission unit 216B. The image output unit 212B, the user input generation unit 214B, and the user input transmission unit 216B may be substantially the same as the image output unit 212, the user input generation unit 214, and the user input transmission unit 216 described above, with reference to FIG. 16. Note that, the image output unit 212B draws the terminal image, on the basis of the image generation condition for a terminal image that is generated by the image condition generation unit 244B described below, and outputs the drawn terminal image to the display unit 23 described above.

Further, in the example illustrated in FIG. 21, the terminal device 20B includes a user database 230B, an avatar database 232B, a UI database 234B, a position information update unit 241B, an image condition generation unit 244B, a movement processing unit 252B, an interface formation unit 248B, and an event generation unit 250B.

Hereinafter, the terminal device 20B according to this user will be described, and substantially the same applies to the terminal device 20B according to the other user.

Each unit of the position information update unit 241B to the event generation unit 250B can be attained by the terminal control unit (refer to the terminal control unit 25 in FIG. 1) of the terminal device 20B executing the virtual reality application according to this embodiment that is a program in the terminal storage unit (refer to the terminal storage unit 22 in FIG. 1) of the terminal device 20B. In addition, the user database 230B, the avatar database 232B, and the UI database 234B can be attained by the terminal storage unit (refer to the terminal storage unit 22 in FIG. 1) of the terminal device 20B.

Among the data in the user database 130 of the server device 10 described above (refer to FIG. 17), only the data relevant to the other avatar positioned in the field of view of this avatar may be stored in the user database 230B, or the other data may be further stored. Among the data in the user database 230B, the data of the position/direction information is updated by the position information update unit 241B, on the basis of the position/direction information transmitted from the server device 10A. Note that, among the data in the user database 230B, the other data may be suitably updated on the basis of the update data described above through the communication with the server device 10A (for example, when activating the virtual reality application according to this embodiment).

Among the data in the avatar database 132 of the server device 10 described above (refer to FIG. 18), only the data relevant to the other avatar positioned in the field of view of this avatar may be stored in the avatar database 232B, or the other data may be further stored. The data in the avatar database 232B may be timely updated on the basis of the update data described above through the communication with the server device 10A.

The UI database 234B attains the same function as that of the UI database 134 of the server device 10 described above.

The position information update unit 241B updates the data of the position/direction information among the data in the user database 230B, on the basis of the received data from the server device 10A as described above. In addition, the position information update unit 241B may update the data of the position/direction information according to this user among the data in the user database 230B, on the basis of the movement manipulation input or the direction manipulation input from this user.

The image condition generation unit 244B attains the same function as that of the image condition generation unit 144 of the server device 10 described above. The image condition generation unit 244B may transmit the generated image generation condition to the server device 10A. In this case, the image generation condition can also be stored on the server device 10A side.

The interface formation unit 248B attains the same function as that of the interface formation unit 148 of the server device 10 described above. Here, the interface formation unit 148 performs the processing relevant to the terminal image for this user.

The event generation unit 250B attains the same function as that of the event generation unit 150 of the server device 10 described above.

The movement processing unit 252B attains the same function as that of the movement processing unit 152 of the server device 10 described above.

Figure 22A:
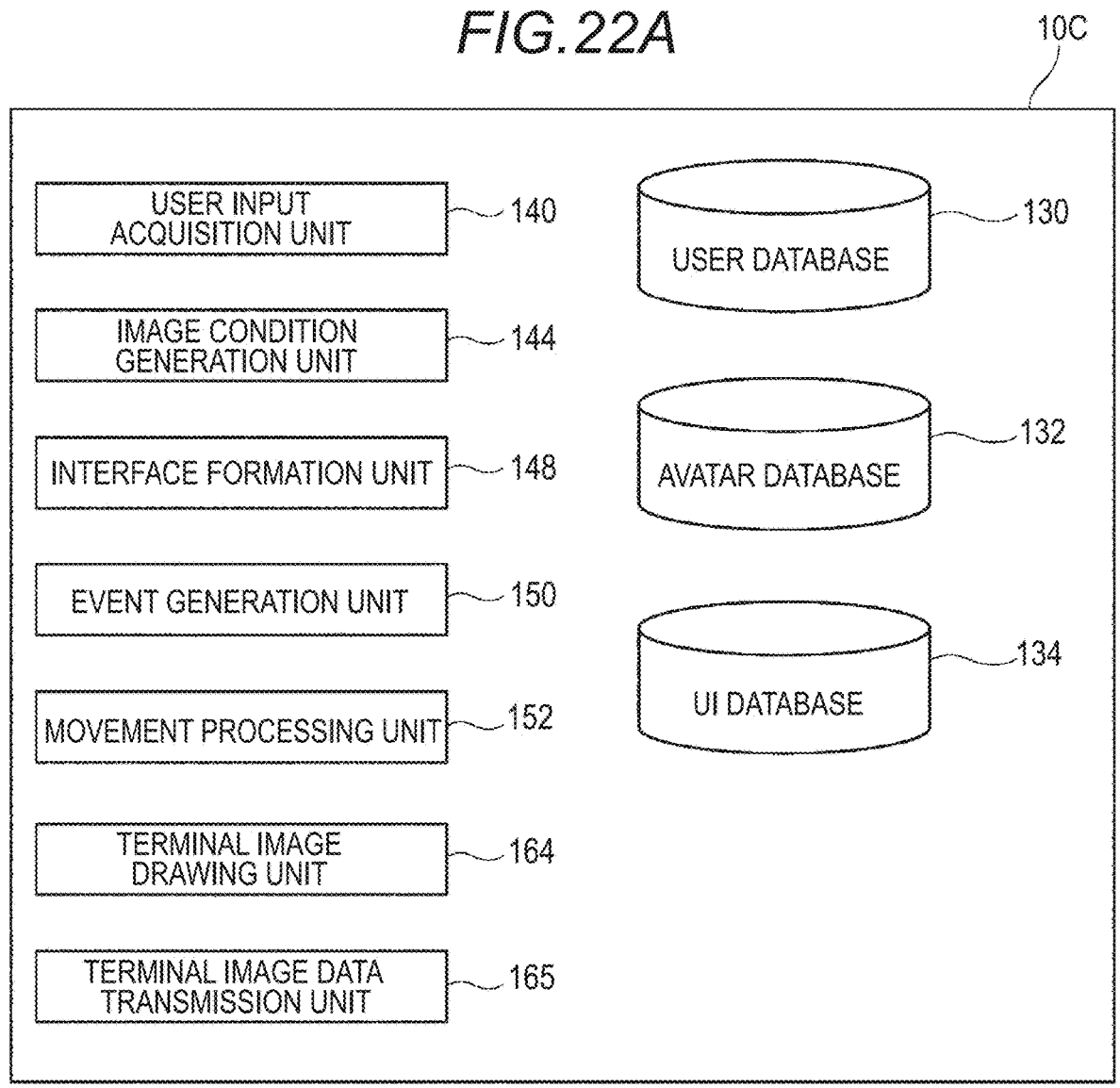
FIG. 22A is an explanatory diagram illustrating still another example of the sharing mode between the server device and the terminal device.
Figure 22B:
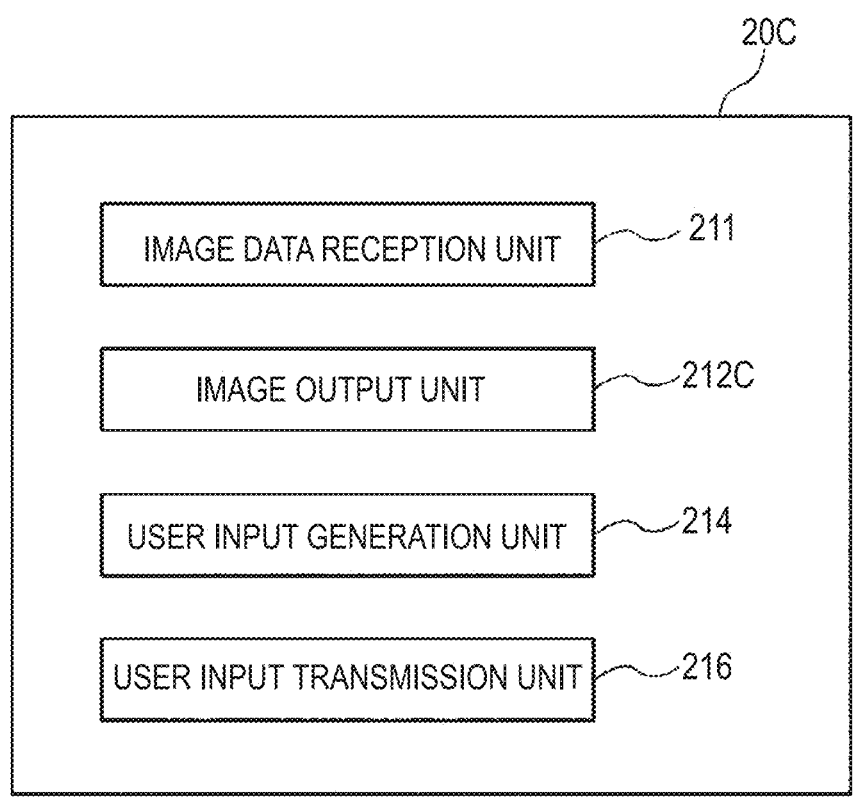
FIG. 22B is an explanatory diagram illustrating still another example of the sharing mode between the server device and the terminal device.

In addition, a sharing mode as illustrated in FIG. 22A and FIG. 22B may be attained. Even in such a case, a server device 10C and a terminal device 20C of each user cooperate with each other to attain the same function as that in a case where the server device 10 and the terminal device 20 described above cooperate with each other.

The server device 10C illustrated in FIG. 22A is different from the server device 10 illustrated in FIG. 15 in that a terminal image drawing unit 164 and a terminal image data transmission unit 165 are added.

The terminal image drawing unit 164 draws the terminal image, on the basis of the image generation condition for a terminal image that is received by the image condition generation unit 144. For example, the image output unit 212 may parse the image generation condition for a terminal image as a query parameter to be stored in a variable, and may perform input as an argument to a given API method, the selection of the avatar information, and the like, and thus, may draw the terminal image.

The terminal image data transmission unit 165 transmits image data for the terminal image drawn by the terminal image drawing unit 164 to each corresponding terminal device 20C.

The terminal device 20C illustrated in FIG. 22B is different from the terminal device illustrated in FIG. 16 in that the image generation condition reception unit 210 and the image output unit 212 are replaced with an image data reception unit 211 and an image output unit 212C, respectively.

The image data reception unit 211 receives the image data for the terminal image that is transmitted by the terminal image data transmission unit 165.

The image output unit 212C outputs the data of the terminal image received by the image data reception unit 211 onto the display unit 23 described above.

Next, an operation example of a part of the operations of the virtual reality generation system 1 will be described with reference to FIG. 23 and FIG. 24.

Figure 23:
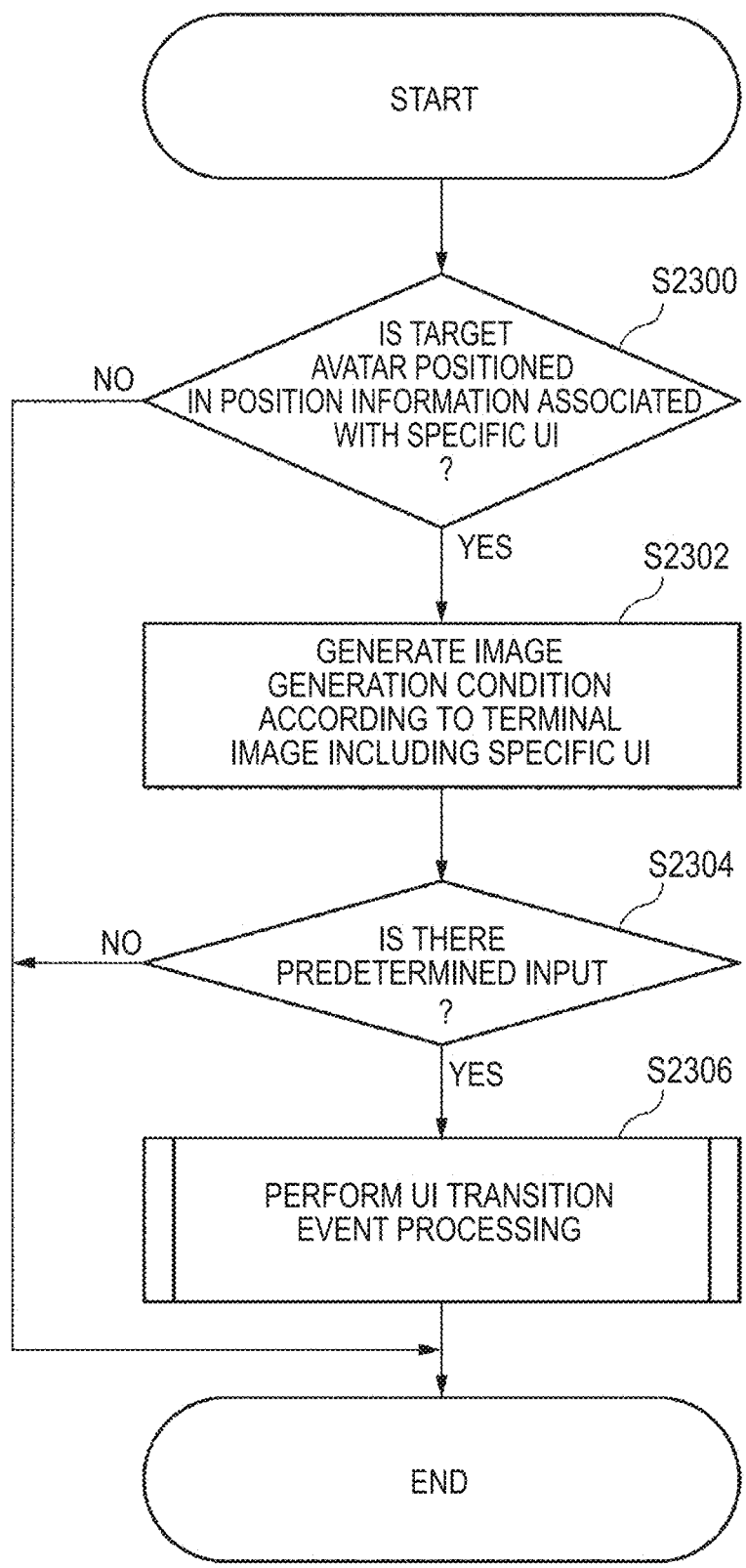
FIG. 23 is a flowchart schematically illustrating an operation associated with the UI transition event, among operations of the virtual reality generation system according to this embodiment.

FIG. 23 is a flowchart schematically illustrating an operation associated with the UI transition event described above among the operations of the virtual reality generation system 1 according to this embodiment. FIG. 23 relates to processing with respect to one avatar (hereinafter, also referred to as a "target avatar"), but the same processing may be executed in parallel on the other avatar.

In step S2300, the server device 10 determines whether the target avatar is positioned in position information associated with one specific user interface (in FIG. 23 and FIG. 24 described below, notated as a "specific UI"). In a case where a determination result is "YES", the process proceeds to step S2302, and otherwise, the processing of this processing cycle is ended.

In step S2302, the server device 10 generates an image generation condition for drawing a terminal image including the specific user interface.

In step S2304, the server device 10 determines whether predetermined input is input by the user. The predetermined input may be input that triggers a high-speed movement to a position (or a region) associated with another specific user interface. For example, in the example illustrated in FIG. 10 described above, the predetermined input is input by the manipulation of the cheer team button SW12. In a case where a determination result is "YES", the process proceeds to step S2306, and otherwise, the processing of this processing cycle is ended.

In step S2306, the server device 10 executes UI transition event processing by setting the position of the target avatar at the current time point to the movement source spot and a position (or a region) associated with another specific user interface according to the predetermined input in step S2304 to the movement destination spot. An example of the UI transition event processing will be described below with reference to FIG. 24.

Figure 24:
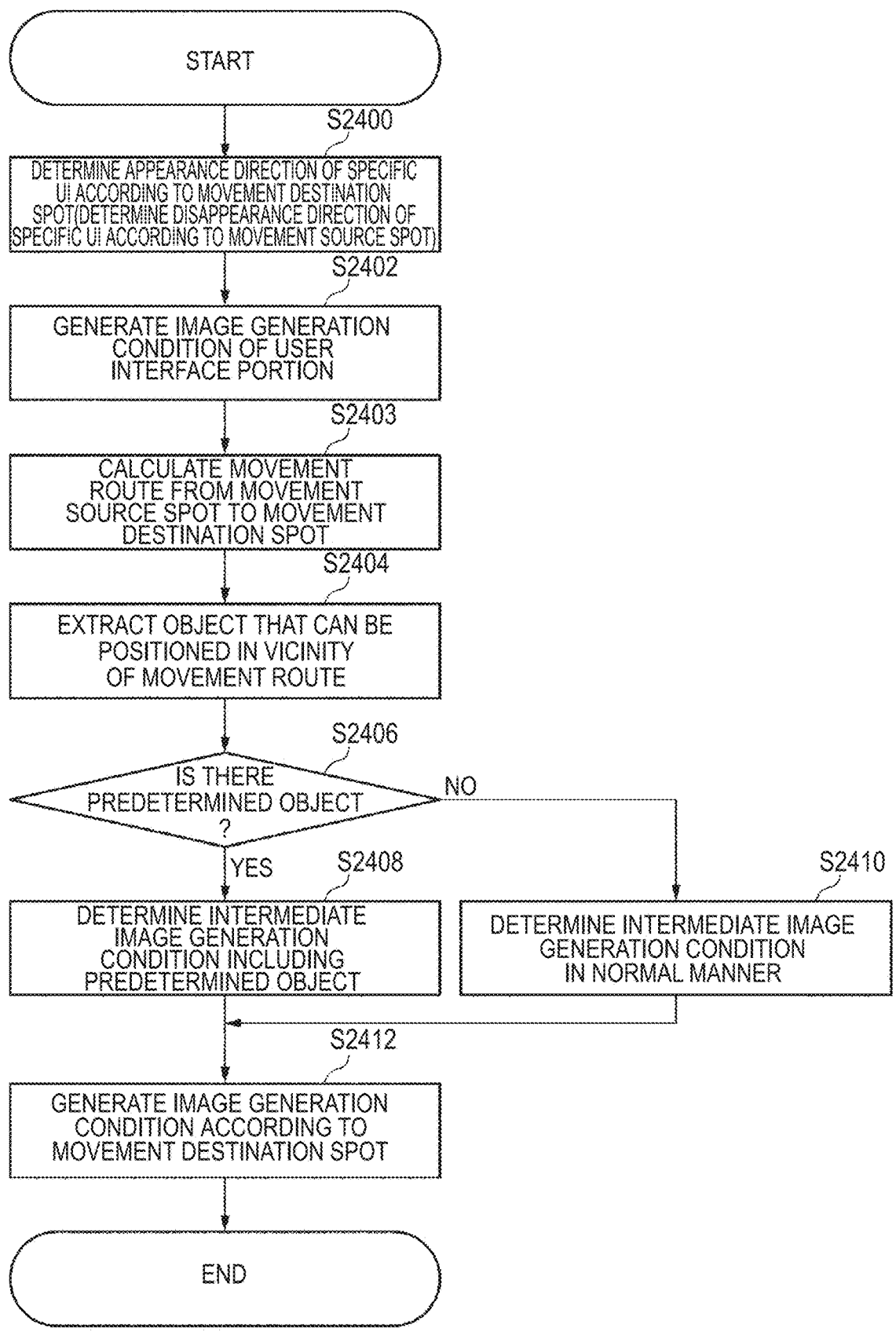
FIG. 24 is a flowchart schematically illustrating an example of UI transition event processing.

FIG. 24 is a flowchart schematically illustrating an example of the UI transition event processing.

In step S2400, the server device 10 determines an appearance direction (a slide-in direction) of the specific user interface associated with the movement destination spot and determines a disappearance direction (a slide-out direction) of the specific user interface associated with the movement source spot, on the basis of a positional relationship between the movement source spot and the movement destination spot according to this UI transition event. Note that, the appearance direction of the specific user interface associated with the movement destination spot and the disappearance direction of the specific user interface associated with the movement source spot are in a relationship in which when one is determined, the other is accordingly determined. For example, in a case where the appearance direction of the specific user interface associated with the movement destination spot is an appearance from the left side, the disappearance direction of the specific user interface associated with the movement source spot is a disappearance to the right side.

Here, in a case where the movement source spot according to the UI transition event is positioned on the right side from the movement destination spot, on the basis of the front direction of the target avatar at a start time point of the UI transition event, the appearance direction is determined such that the specific user interface associated with the movement destination spot appears from the right side. In this case, the disappearance direction is determined such that the specific user interface associated with the movement source spot disappears to the left side.

In step S2402, the server device 10 generates an image generation condition of a user interface portion among the terminal image according to this UI transition event, on the basis of the appearance direction and the disappearance direction of the specific user interface that are determined in step S2400.

In step S2403, the server device 10 calculates a movement route from the movement source spot to the movement destination spot and calculates the visual line direction of the target avatar (that is, the visual line direction of the virtual camera 60) in each position on the movement route.

In step S2404, the server device 10 extracts the other avatar and the second object M3 that can be positioned in the vicinity of the movement route, on the basis of the movement route calculated in step S2403.

In step S2406, the server device 10 determines whether there is a predetermined object among the other avatar and the second object M3 that are extracted in step S2404. Any predetermined object is, preferably, the other avatar or the second object M3 that is useful for the target avatar to recognize. For example, the predetermined object may be an avatar in the friend relationship, an avatar to be an enemy on the game (for example, an avatar that can attack the target avatar), the second object M3 that is useful to acquire on the game, or the like. In a case where a determination result is "YES", the process proceeds to step S2408, and otherwise, the process proceeds to step S2410.

In step S2408, the server device 10 determines an intermediate image generation condition such that the predetermined object is drawn in one or more positions on the movement route, on the basis of the movement route and the visual line direction of the avatar that are calculated in step S2403. That is, the server device 10 generates an image generation condition of an intermediate image portion among the terminal image according to this UI transition event in a manner that the predetermined object is drawn.

In step S2410, the server device 10 determines the intermediate image generation condition in one or more positions on the movement route, on the basis of the movement route and the visual line direction of the avatar that are calculated in step S2403. That is, the server device 10 generates the image generation condition of the intermediate image portion among the terminal image according to this UI transition event in a normal manner. In this case, the intermediate image generation condition may be an animation image generation condition prepared in advance.

In step S2412, the server device 10 generates an image generation condition for drawing a terminal image (a portion other than the user interface portion) when the target avatar reaches the movement destination spot.

According to the example illustrated in FIG. 24 as described above, the image generation condition of the terminal image can be generated in a manner that the appearance direction and the disappearance direction of the specific user interface are changed in accordance with the positional relationship between the movement source spot and the movement destination spot. In addition, since the image generation condition for drawing the intermediate image is generated, the virtual space image in the middle of the high-speed movement can be generated in conjunction with the movement of the specific user interface. As a result thereof, it is possible to more effectively reduce a sense of discomfort that is the problem described above.

In addition, according to the example illustrated in FIG. 24, the predetermined object that is capable of entering the field of view of the target avatar while the target avatar moves from the movement source spot to the movement destination spot of this time is visible (visible as the target avatar) through the intermediate image. Here, in a modification example, the intermediate image may be determined regardless of the presence or absence of the predetermined object, and in another modification example, the intermediate image may be omitted.

In addition, in the example illustrated in FIG. 23 and FIG. 24, the movement source spot corresponds to a position associated with the specific user interface, but is not limited thereto. That is, the terminal image at the movement source spot can also be applied to a case where the specific user interface is not included. Even in such a case, similarly, an appearance mode of the specific user interface associated with the movement destination spot can be similarly determined on the basis of the positional relationship between the movement source spot and the movement destination spot. In addition, one or more intermediate images with respect to the terminal image according to the movement source spot and the movement destination spot can also be similarly determined.

Each embodiment has been described in detail, but the disclosure is not limited to a specific embodiment, and various modifications and changes can be made within the scope described in the claims. For example, in the embodiments described in this disclosure, certain features may be described with the singular forms "a," "an," "the," or similar language; however, as used throughout this disclosure, the singular forms "a," "an," or "the" may encompass plural references as well unless the context clearly dictates otherwise. In addition, all or a plurality of configuration elements of the embodiment described above can also be combined.

REFERENCE SIGNS LIST 1 virtual reality generation system
3 network
10, 10A, 10C server device
11 server communication unit
12 server storage unit
13 server control unit
20, 20A, 20B, 20C terminal device
21 terminal communication unit
22, 22A terminal storage unit
23 display unit
24 input unit
25 terminal control unit
70 virtual camera
70 space portion
71 free space portion
130 user database
132 avatar database
134 UI database
140 user input acquisition unit (example of input acquisition unit)
144 image condition generation unit (example of drawing processing unit)
148 interface formation unit (example of output processing unit)
150 event generation unit
152 movement processing unit (example of position control unit)
164 terminal image drawing unit
165 terminal image data transmission unit
166 position information acquisition unit
167 position information transmission unit
168 data update processing unit
210 image generation condition reception unit
211 image data reception unit
212, 212A, 212B, 212C image output unit
214, 214A, 214B user input generation unit (example of input acquisition unit)
216, 216A, 216B user input transmission unit
230B user database
232B avatar database
234B UI database
241A, 241B position information update unit
244A, 244B image condition generation unit (example of drawing processing unit)

248A, 248B interface formation unit (example of output processing unit)
250A, 250B event generation unit
252A, 252B movement processing unit (example of position control unit)

The invention claimed is:

1. An information processing system comprising a memory and processing circuitry, the processing circuitry configured to perform steps of:
acquiring user input from a user associated with a predetermined display medium movable in a virtual space;
controlling a position of the predetermined display medium in the virtual space, on the basis of the user input; and
outputting a user interface capable of generating the user input, and switching the user interface from a first user interface to a second user interface when the predetermined display medium is moved from a first position to a second position in the virtual space,
wherein the processing circuitry is configured to change a switching mode from the first user interface to the second user interface, on the basis of a positional relationship between the first position and the second position in the virtual space;
wherein the processing circuitry is configured to cause the second user interface to appear from a right side of a display screen or a field of view of a virtual camera when the second position in the virtual space is positioned on a right side from the first position, on the basis of a visual line direction of the virtual camera in the virtual space, and is configured to cause the second user interface to appear from a left side of the display screen or the field of view of the virtual camera when the second position in the virtual space is positioned on a left side from the first position.

2. The information processing system according to claim 1,
wherein the processing circuitry is configured to cause the first user interface to disappear to a left side of a display screen or a field of view of a virtual camera when the second position in the virtual space is positioned on a right side from the first position, on the basis of a visual line direction of the virtual camera in the virtual space, and is configured to cause the first user interface to disappear to a right side of the display screen or the field of view of the virtual camera when the second position in the virtual space is positioned on a left side from the first position.

3. The information processing system according to claim 1, wherein the processing circuitry is further configured to perform a step of:
switching a virtual space image representing a state of the virtual space in a field of view of the virtual camera in the virtual space from a first virtual space image to a second virtual space image when the predetermined display medium is moved from the first position to the second position in the virtual space,
wherein the processing circuitry is configured to change a switching mode from the first virtual space image to the second virtual space image, on the basis of the positional relationship between the first position and the second position in the virtual space.

4. The information processing system according to claim 3,
wherein the processing circuitry is configured to cause the second virtual space image to appear from a right side of the field of view of the virtual camera when the second position in the virtual space is positioned on the right side from the first position, on the basis of a visual line direction of the virtual camera, and is configured to cause the second virtual space image to appear from a left side of the field of view of the virtual camera when the second position in the virtual space is positioned on the left side from the first position.

5. The information processing system according to claim 3,
wherein the processing circuitry is configured to cause the first virtual space image to disappear to a left side of the field of view of the virtual camera when the second position in the virtual space is positioned on a right side from the first position, on the basis of a visual line direction of the virtual camera, and is configured to cause the first virtual space image to disappear to the right side of the field of view of the virtual camera when the second position in the virtual space is positioned on the left side from the first position.

6. The information processing system according to claim 3,
wherein the processing circuitry is configured to draw an intermediate image between the first virtual space image and the second virtual space image when switching from the first virtual space image to the second virtual space image, and
the intermediate image includes images of one or more objects disposed between the first position and the second position.

7. The information processing system according to claim 6,
wherein the intermediate image includes a virtual space image representing a state of the virtual space in the field of view of the virtual camera in the middle of change when a visual line direction of the virtual camera is changed from a front direction of the predetermined display medium in the first position to a front direction of the predetermined display medium in the second position.

8. The information processing system according to claim 6,
wherein the intermediate image includes a virtual space image representing a state of the virtual space in the field of view of the virtual camera in an intermediate position when the position of the predetermined display medium is moved from the first position to the second position while changing the position through one or more intermediate positions.

9. The information processing system according to claim 1, wherein the processing circuitry is further configured to perform a step of:
switching a virtual space image representing a state of the virtual space in the field of view of the virtual camera in the virtual space from a first virtual space image to a second virtual space image when the predetermined display medium is moved from the first position to the second position in the virtual space,
wherein the processing circuitry is configured to change a switching mode from the first virtual space image to the second virtual space image, on the basis of the positional relationship between the first position and the second position in the virtual space.

10. The information processing system according to claim 9,
wherein the processing circuitry is configured to cause the second virtual space image to appear from the right side of the field of view of the virtual camera when the second position in the virtual space is positioned on the right side from the first position, on the basis of the visual line direction of the virtual camera, and is configured to cause the second virtual space image to appear from the left side of the field of view of the virtual camera when the second position in the virtual space is positioned on the left side from the first position.

11. The information processing system according to claim 9, wherein the processing circuitry is configured to cause the first virtual space image to disappear to the left side of the field of view of the virtual camera when the second position in the virtual space is positioned on the right side from the first position, on the basis of the visual line direction of the virtual camera, and is configured to cause the first virtual space image to disappear to the right side of the field of view of the virtual camera when the second position in the virtual space is positioned on the left side from the first position.

12. The information processing system according to claim 9, wherein the processing circuitry is configured to draw an intermediate image between the first virtual space image and the second virtual space image when switching from the first virtual space image to the second virtual space image, and the intermediate image includes images of one or more objects disposed between the first position and the second position.

13. The information processing system according to claim 2, wherein the processing circuitry is further configured to perform a step of:

switching a virtual space image representing a state of the virtual space in the field of view of the virtual camera in the virtual space from a first virtual space image to a second virtual space image when the predetermined display medium is moved from the first position to the second position in the virtual space, wherein the processing circuitry is configured to change a switching mode from the first virtual space image to the second virtual space image, on the basis of the positional relationship between the first position and the second position in the virtual space.

14. The information processing system according to claim 13, wherein the processing circuitry is configured to cause the second virtual space image to appear from the right side of the field of view of the virtual camera when the second position in the virtual space is positioned on the right side from the first position, on the basis of the visual line direction of the virtual camera, and is configured to cause the second virtual space image to appear from the left side of the field of view of the virtual camera when the second position in the virtual space is positioned on the left side from the first position.

15. The information processing system according to claim 13, wherein the processing circuitry is configured to cause the first virtual space image to disappear to the left side of the field of view of the virtual camera when the second position in the virtual space is positioned on the right side from the first position, on the basis of the visual line direction of the virtual camera, and is configured to cause the first virtual space image to disappear to the right side of the field of view of the virtual camera when the second position in the virtual space is positioned on the left side from the first position.

16. The information processing system according to claim 13, wherein the processing circuitry is configured to draw an intermediate image between the first virtual space image and the second virtual space image when switching from the first virtual space image to the second virtual space image, and the intermediate image includes images of one or more objects disposed between the first position and the second position.

17. The information processing system according to claim 1, wherein the processing circuitry is configured to automatically attain a movement of the predetermined display medium from the first position to the second position, on the basis of predetermined input that is input from at least one of the first user interface, or another user interface to be output together with the first user interface.

18. A non-transitory computer-readable medium comprising program code that, when executed by a computer, is configured to cause the computer to execute:

input acquisition processing of acquiring user input from a user associated with a predetermined display medium movable in a virtual space;

position control processing of controlling a position of the predetermined display medium in the virtual space, on the basis of the user input; and output processing of outputting a user interface capable of generating the user input, the output processing of switching the user interface from a first user interface to a second user interface when the predetermined display medium is moved from a first position to a second position in the virtual space, wherein the output processing includes changing a switching mode from the first user interface to the second user interface, on the basis of a positional relationship between the first position and the second position in the virtual space;

wherein the non-transitory computer-readable medium is configured to cause the second user interface to appear from a right side of a display screen or a field of view of a virtual camera when the second position in the virtual space is positioned on a right side from the first position, on the basis of a visual line direction of the virtual camera in the virtual space, and is configured to cause the second user interface to appear from a left side of the display screen or the field of view of the virtual camera when the second position in the virtual space is positioned on a left side from the first position.

19. An information processing method executed by a computer, comprising:

acquiring user input from a user associated with a predetermined display medium movable in a virtual space;

controlling a position of the predetermined display medium in the virtual space, on the basis of the user input; and outputting a user interface capable of generating the user input, wherein outputting the user interface includes switching the user interface from a first user interface to a second user interface when the predetermined display medium is moved from a first position to a second position in the virtual space, and the switching includes changing a switching mode from the first user interface to the second user interface, on the basis of a positional relationship between the first position and the second position in the virtual space;

further comprising causing the second user interface to appear from a right side of a display screen or a field of view of a virtual camera when the second position in the virtual space is positioned on a right side from the first position, on the basis of a visual line direction of the virtual camera in the virtual space, and is configured to cause the second user interface to appear from a left side of the display screen or the field of view of the virtual camera when the second position in the virtual space is positioned on a left side from the first position.

* * * * *